US010373397B2

(12) United States Patent
Mitsunaga et al.

(10) Patent No.: US 10,373,397 B2
(45) Date of Patent: Aug. 6, 2019

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Tomoo Mitsunaga, Kanagawa (JP); Kensei Jo, Kumamoto (JP); Takayuki Yoshigahara, Tokyo (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/544,965

(22) PCT Filed: Jan. 22, 2016

(86) PCT No.: PCT/JP2016/051803
§ 371 (c)(1),
(2) Date: Jul. 20, 2017

(87) PCT Pub. No.: WO2016/125603
PCT Pub. Date: Aug. 11, 2016

(65) Prior Publication Data
US 2017/0352197 A1 Dec. 7, 2017

(30) Foreign Application Priority Data

Feb. 5, 2015 (JP) ................. 2015-021079

(51) Int. Cl.
G06K 9/00 (2006.01)
G07B 15/00 (2011.01)
(Continued)

(52) U.S. Cl.
CPC .......... G07B 15/00 (2013.01); G06K 7/1417 (2013.01); G06K 9/00255 (2013.01);
(Continued)

(58) Field of Classification Search
CPC ....... G06K 2007/10524; G06K 7/1417; G06K 9/00013; G06K 9/00087; G06K 9/00255;
(Continued)

(56) References Cited

U.S. PATENT DOCUMENTS 6,999,936 B2 * 2/2006 Sehr ................. G06Q 10/02
705/16
8,462,994 B2 * 6/2013 Ortiz ................. G07C 9/00087
340/5.8
(Continued)

FOREIGN PATENT DOCUMENTS

JP 2004-295197 A 10/2004
JP 2008-510231 A 4/2008
(Continued)

OTHER PUBLICATIONS

International Search Report and Written Opinion of PCT Application No. PCT/JP2016/051803, dated Apr. 26, 2016, 02 pages of English Translation and 07 pages of ISRWO.

Primary Examiner — Bhavesh M Mehta
Assistant Examiner — Ian L Lemieux
(74) Attorney, Agent, or Firm — Chip Law Group

(57) ABSTRACT

The present technology relates to an information processing device, an information processing method, a program, and an information processing system realizing smooth entrance with an electronic ticket. ID information used for determining admittance or non-admittance of entrance with an electronic ticket is extracted from a captured image of a superimposition image which contains a predetermined image and the ID information superimposed on the predetermined image to determine admittance or non-admittance of entrance with the electronic ticket on the basis of the electronic ticket and the ID information. For example, the present technology is applicable to an entrance gate system (Continued)

or others provided to check entrance into an event site or the like.

19 Claims, 28 Drawing Sheets

(51) Int. Cl.
```
G06Q 10/02      (2012.01)
G06Q 50/10      (2012.01)
G06T 7/00       (2017.01)
G07B 11/00      (2006.01)
G06K 7/14       (2006.01)
G06K 9/20       (2006.01)
G06K 9/46       (2006.01)
G06K 9/78       (2006.01)
G06K 7/10       (2006.01)
```
(52) U.S. Cl.
CPC ..... *G06K 9/00288* (2013.01); *G06K 9/00885* (2013.01); *G06K 9/2027* (2013.01); *G06K 9/46* (2013.01); *G06K 9/78* (2013.01); *G06Q 10/02* (2013.01); *G06Q 50/10* (2013.01); *G06T 7/00* (2013.01); *G07B 11/00* (2013.01); G06K 9/00013 (2013.01); G06K 9/00087 (2013.01); G06K 9/00604 (2013.01); G06K 9/00617 (2013.01); G06K 2007/10524 (2013.01)

(58) Field of Classification Search
CPC .......... G06K 9/00288; G06K 9/00604; G06K 9/00617; G06K 9/00885; G06K 9/2027; G06K 9/46; G06K 9/78; G06Q 10/02; G06Q 50/10; G06T 7/00; G07B 11/00; G07B 15/00
See application file for complete search history.

(56) References Cited

U.S. PATENT DOCUMENTS

| | | | | |
|---|---|---|---|---|
| 8,892,453 | B2* | 11/2014 | Nakamura | G06Q 10/02 705/26.1 |
| 2001/0051915 | A1* | 12/2001 | Ueno | G06Q 20/04 705/39 |
| 2002/0169623 | A1* | 11/2002 | Call | G06Q 10/02 705/5 |
| 2007/0046426 | A1* | 3/2007 | Ishibashi | G07C 9/00087 340/5.52 |
| 2007/0203763 | A1* | 8/2007 | Ackley | G06Q 10/00 705/5 |
| 2007/0276944 | A1* | 11/2007 | Samovar | G07C 9/00103 709/225 |
| 2008/0154623 | A1* | 6/2008 | Derker | G06Q 10/087 705/1.1 |
| 2013/0096961 | A1* | 4/2013 | Owens | G06Q 10/02 705/5 |
| 2013/0173484 | A1* | 7/2013 | Wesby | G06Q 30/06 705/318 |
| 2013/0279757 | A1* | 10/2013 | Kephart | G06K 9/00771 382/105 |
| 2015/0120342 | A1* | 4/2015 | Dragon | G06Q 10/02 705/5 |
| 2015/0193702 | A1* | 7/2015 | Grbavac | G06Q 10/02 705/51 |
| 2015/0294515 | A1* | 10/2015 | Bergdale | G06Q 20/045 340/5.61 |
| 2015/0363989 | A1* | 12/2015 | Scalisi | G07C 9/00904 348/143 |

FOREIGN PATENT DOCUMENTS

| | | | |
|---|---|---|---|
| JP | 2010-128629 | A | 6/2010 |
| JP | 2012-008746 | A | 1/2012 |
| JP | 2012-8746 | A | 1/2012 |
| JP | 2014-067175 | A | 4/2014 |
| JP | 2014-67175 | A | 4/2014 |
| JP | 2014-191558 | A | 10/2014 |

* cited by examiner

RECEPTION SCREEN  TICKET SCREEN

RECEPTION SCREEN  TICKET SCREEN

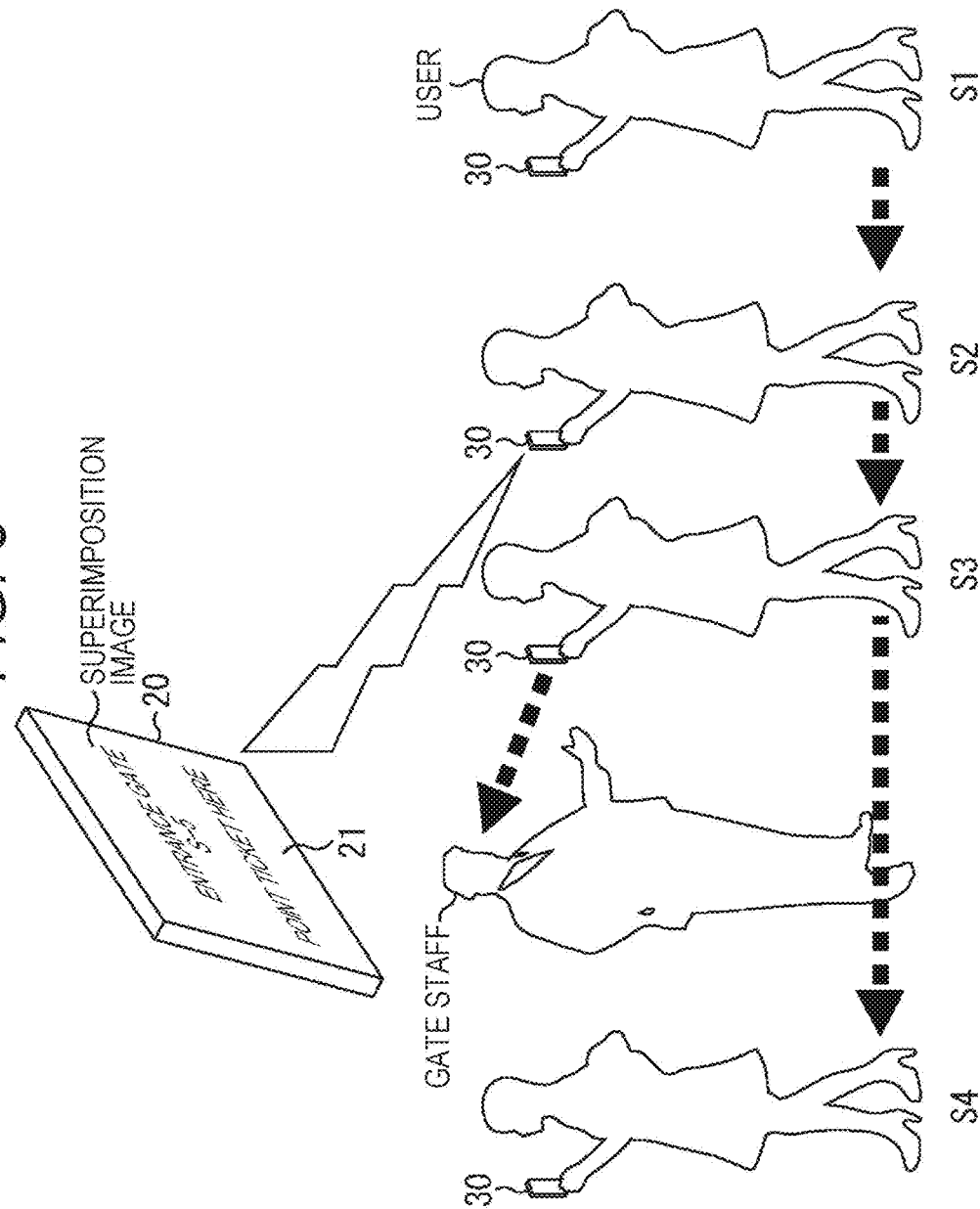

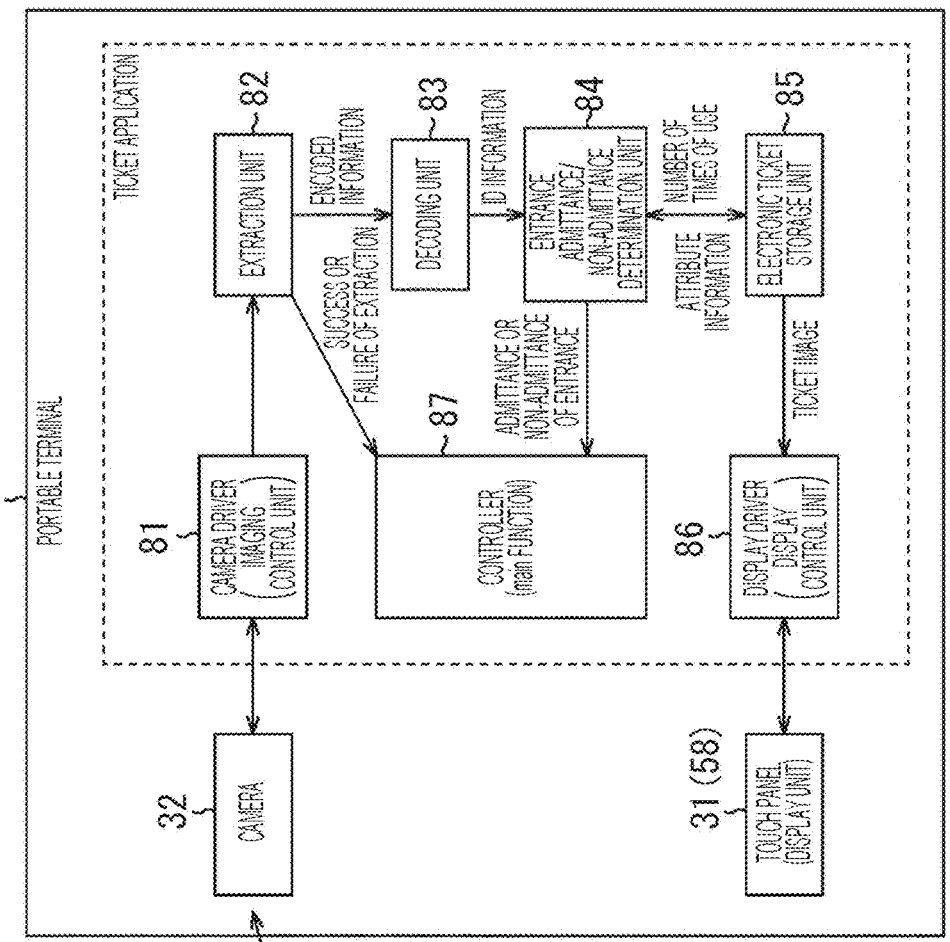
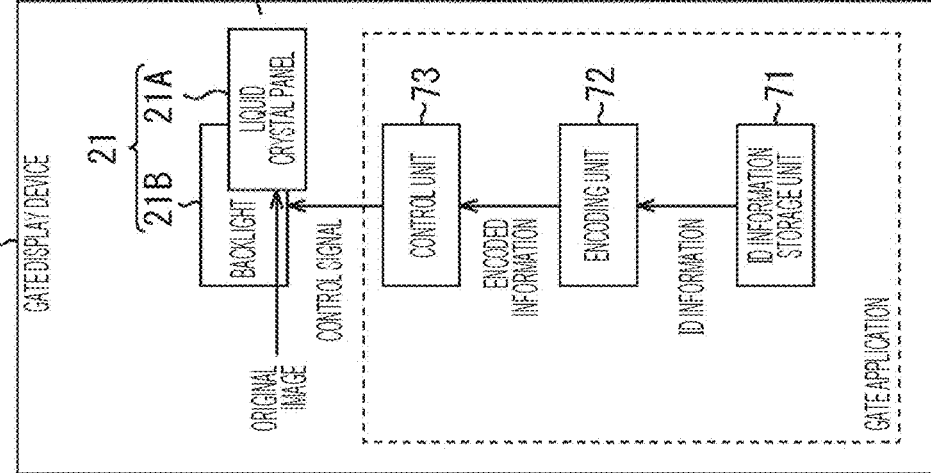
FIG. 12

FIG. 21
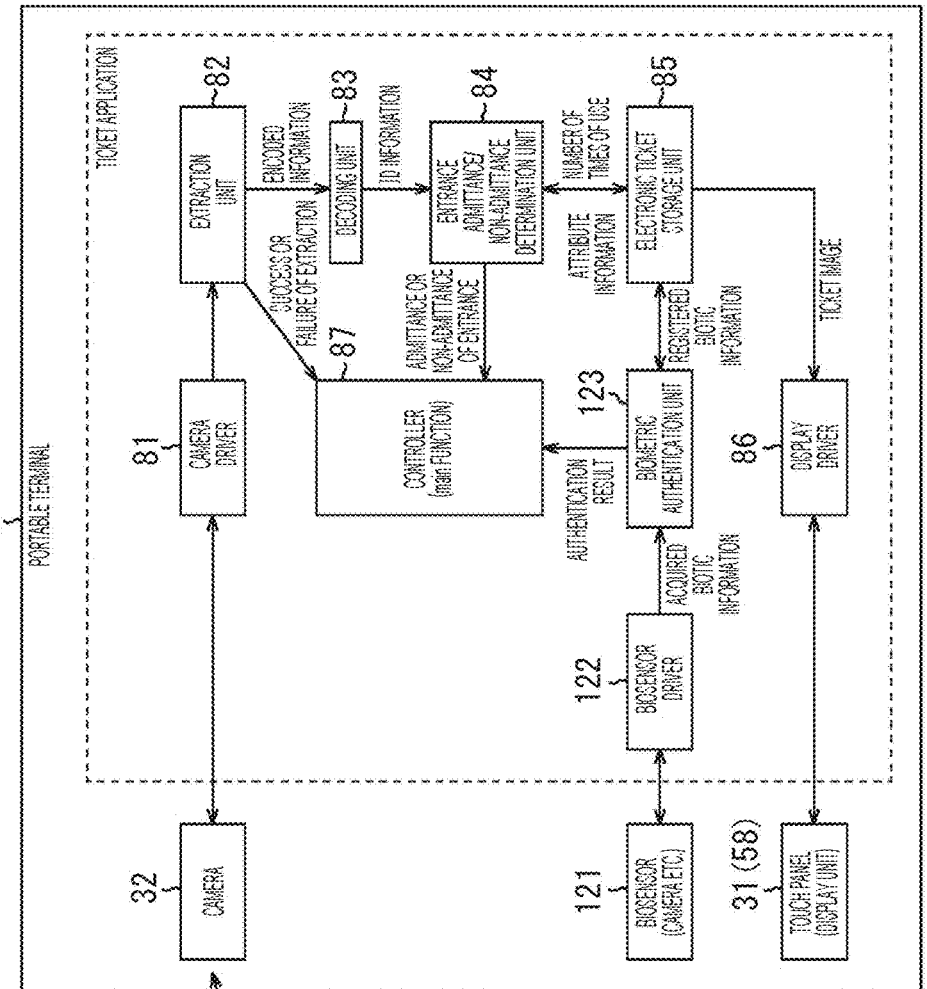
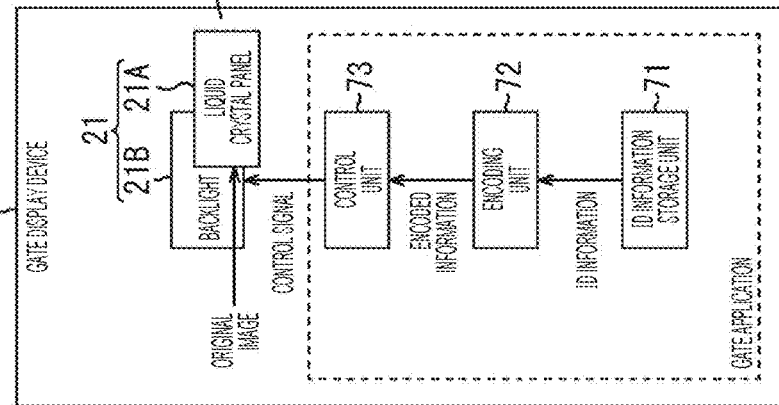

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2016/051803 filed on Jan. 22, 2016, which claims priority benefit of Japanese Patent Application No. JP 2015-021079 filed in the Japan Patent Office on Feb. 5, 2015. Each of the above-referenced applications is hereby incorporated herein by reference in its entirety.

TECHNICAL FIELD

The present technology relates to an information processing device, an information processing method, a program, and an information processing system, and more particularly to an information processing device, an information processing method, a program, and an information processing system for realizing smooth entrance with an electronic ticket, for example.

BACKGROUND ART

For example, there has been proposed an authentication system which uses an electronically operating ticket (electronic ticket), rather than a paper ticket, for entrance into an event site or transportation facilities, seat reservation or purchase, or for other purposes (for example, see Patent Documents 1 and 2).

This type of authentication system is constituted by a terminal carried by a user, and an authentication device performing authentication. In this case, the authentication device reads an electronic ticket supplied as authentication information from the terminal for use of authentication, and performs authentication on the basis of the electronic ticket.

CITATION LIST

Patent Document

Patent Document 1: Japanese Patent Application Laid-Open No. 2010-128629
Patent Document 2: Japanese Patent Application National Publication (Laid-Open) No. 2008-510231

SUMMARY OF THE INVENTION

Problems to be Solved by the Invention

In case of authentication based on an electronic ticket read by an authentication device from a terminal as described above, entrance into an event site or other places with an electronic ticket is considerably limited by the number of authentication devices provided at entrance gates for authentication. In this case, smooth entrance of a large number of attendants into the event site may become difficult.

The present technology developed in consideration of the aforementioned circumstances realizes smooth entrance with an electronic ticket, for example.

Solutions to Problems

An information processing device and a program according to the present technology is directed to an information processing device, and a program under which a computer functions as this information processing device, the information processing device and the program including: an extraction unit that extracts ID information from a captured image of a superimposition image, the superimposition image containing a predetermined image and the ID information superimposed on the predetermined image, to determine admittance or non-admittance of entrance with an electronic ticket; and an entrance admittance/non-admittance determination unit that determines admittance or non-admittance of entrance with the electronic ticket on the basis of the electronic ticket stored in a storage unit, and on the ID information.

An information processing method according to the present technology is directed to an information processing method including steps of: extracting ID information from a captured image of a superimposition image, the superimposition image containing a predetermined image and the ID information superimposed on the predetermined image, to determine admittance or non-admittance of entrance with an electronic ticket; and determining admittance or non-admittance of entrance with the electronic ticket on the basis of the electronic ticket stored in a storage unit, and on the ID information.

An information processing system according to the present technology is directed to an information processing system including: a providing device that provides a superimposition image that contains a predetermined image, and ID information superimposed on the predetermined image and used for determining admittance or non-admittance of entrance with an electronic ticket; and an information processing device that includes an extraction unit that extracts the ID information from a captured image of the superimposition image provided by the providing device, and an entrance admittance/non-admittance determination unit that determines admittance or non-admittance of entrance with the electronic ticket on the basis of the electronic ticket stored in a storage unit, and on the ID information.

According to the present technology, admittance or non-admittance of entrance with the electronic ticket is determined on the basis of the electronic ticket stored in the storage unit, and on the ID information used for admittance or non-admittance of entrance with the electronic ticket and extracted from the captured image of the superimposition image which contains the predetermined image and the ID information superimposed on the predetermined image.

Note that the information processing device may be either an independent device, or an internal block constituting one device.

In addition, the program may be transmitted via a transmission medium, or stored in a recording medium to be provided.

Effects of the Invention

According to the present technology, smooth entrance with an electronic ticket is realizable.

Note that advantages to be offered are not limited to the aforementioned advantage, but may be any of advantages described in the present disclosure.

BRIEF DESCRIPTION OF DRAWINGS

FIG. 1 is a view illustrating an example of entrance gates of an event or the like.

FIG. 8 is a view illustrating an example of procedures for ticket authentication performed by the entrance gate system.

FIG. 12 is a block diagram showing a functional configuration example of the gate display device 20 and the portable terminal 30.

FIG. 21 is a block diagram showing a functional configuration example of the gate display device 20 and the portable terminal 30 in case of execution of user authentication and ticket authentication.

MODES FOR CARRYING OUT THE INVENTION

<Example of Entrance Checking in Event Etc.>

Figure 1:
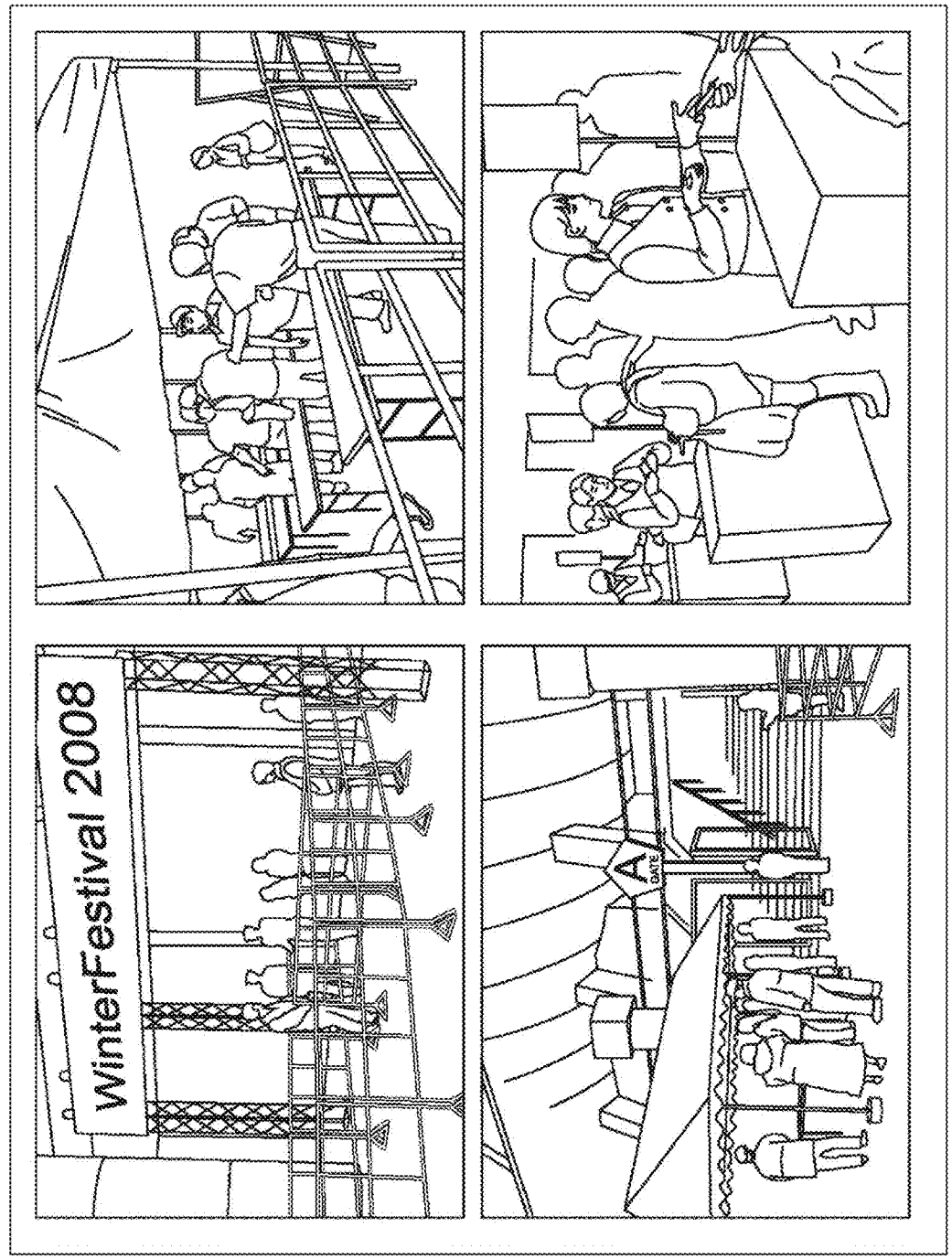

FIG. 1 is a view illustrating an example of entrance gates in an event or the like.

Generally, a user attending an event held at a stadium or a hall with a large number of attendants purchases a pay (entrance) ticket, and presents the purchased ticket when entering an event site for an event.

FIG. 1 illustrates an example of entrance gates for checking (authenticating) entrance with paper tickets.

Entrance gates are built at an entrance of the event site. At the entrance gates, paper tickets carried by users corresponding to attendants are checked one by one in a limited flow of the users. During checking, a part of each ticket is removed (for "ticket collection").

Gate structures constituting entrance gates are permanently built in a permanent theme park managed by a permanent event-managing organization, an amusement park, or like places. On the other hand, for an event held in a multipurpose hall or like places, entrance gates in a size corresponding to an event scale, a type, a scale of an organizing body or other conditions are temporarily built for each event. For example, paths (lanes) extending toward the entrance gates are formed by fences, ropes or the like as illustrated in FIG. 1. Tables for ticket checking or pamphlet distribution, and gate staffs are deployed at the entrance gates. Each of the gate staffs at the entrance gates then guides attendants, and checks tickets.

Figure 2A:
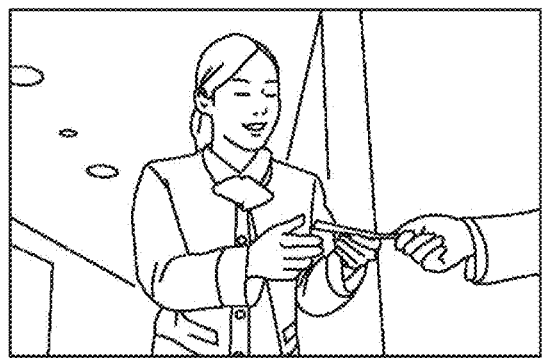
FIGS. 2A, 2B and 2C are views illustrating examples of a ticket checking method.
Figure 2B:
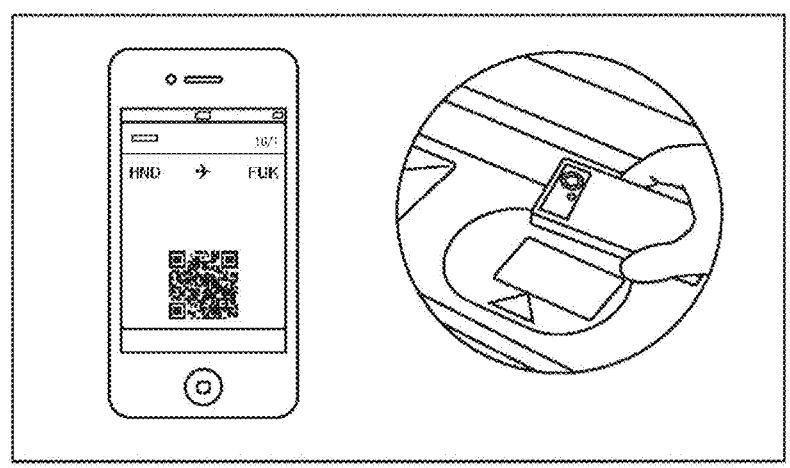
Figure 2C:
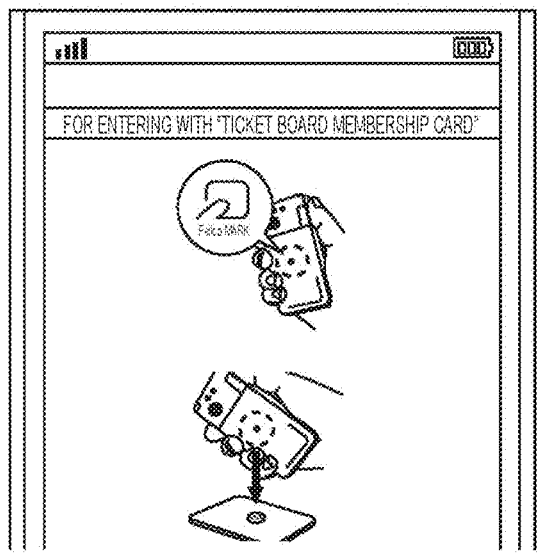

FIGS. 2A, 2B and 2C are views illustrating examples of a ticket checking method.

FIG. 2A shows an example of paper ticket checking.

In case of a paper ticket, a user carrying a paper ticket presents the ticket to a gate staff at an entrance gate. The gate staff receives the paper ticket carried by the user for visual checking one by one, and removes a stub from the ticket as a proof of entrance.

FIGS. 2B and 2C are examples of electronic ticket checking.

Electronization of tickets has been progressing in recent years. Event tickets are purchasable through the Internet, and usable at events as electronically operating tickets (electronic tickets). The user purchases an electronic ticket at a site of an event organizer, a ticket distributer or the like, retains the electronic ticket (ticket converted into data) in a portable terminal such as a smartphone, and presents the electronic ticket to a gate staff or allows a ticket reader to read the electronic ticket at an entrance gate for authentication.

FIG. 2B illustrates an example of electronic ticket reading by using a QR code (registered trademark).

In case of electronic ticket reading by using a QR code, a QR code added to an electronic ticket and stored (retained) in a portable terminal is read by a QR code reader at an entrance gate. Then, after the QR code is read by the QR code reader, authentication is performed to check the electronic ticket.

FIG. 2C illustrates an example of electronic ticket reading by using near field communication (NFC).

In case of electronic ticket reading by using NFC, an electronic ticket stored in a portable terminal is read by an NFC reader by utilizing an NFC card function of the portable terminal. Thereafter, authentication is performed to check the electronic ticket read by the NFC reader.

Figure 3A:
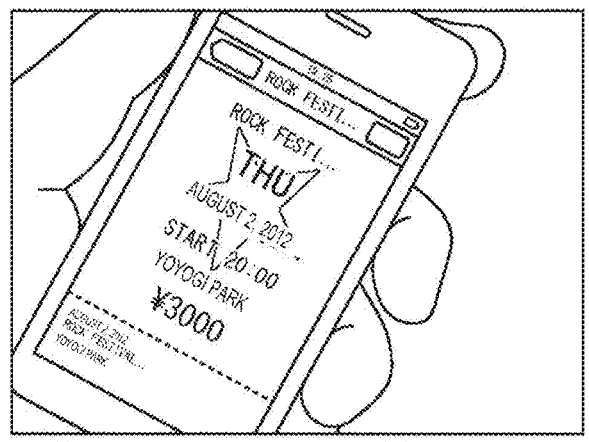
FIGS. 3A, 3B and 3C are views illustrating an electronic ticket checking method called tixee.
Figure 3B:
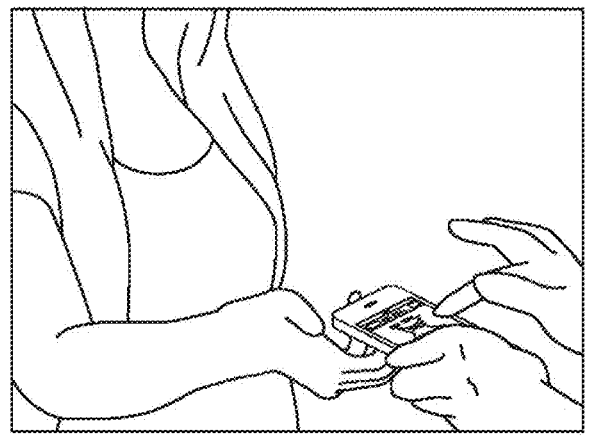
Figure 3C:
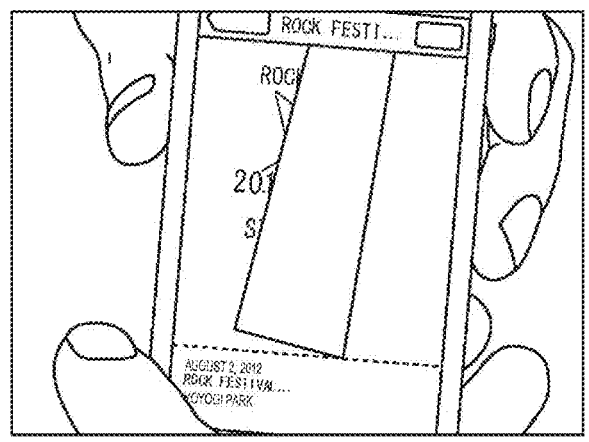

FIGS. 3A, 3B and 3C are views illustrating an electronic ticket checking method called tixee.

The user purchases and retains an electronic ticket by using an application provided for portable terminals to realize on-line purchase of electronic tickets.

An electronic ticket may be checked by using a QR code reader or an NFC reader as described with reference to FIGS. 2A, 2B and 2C. In case of tixee, however, the user displays an electronic ticket on a display of a portable terminal by using a predetermined application, and presents the portable terminal to a gate staff at an entrance gate. The gate staff checks the electronic ticket displayed on the portable terminal, and virtually removes a ticket stub from the electronic ticket.

FIG. 3A illustrates a display example of an electronic ticket on a portable terminal, while FIG. 3B illustrates a state that the user presents the portable terminal showing the electronic ticket to the gate staff. FIG. 3C illustrates a state that the gate staff swipes the electronic ticket displayed on the portable terminal of the user to virtually remove a ticket stub from the electronic ticket.

Figure 4A:
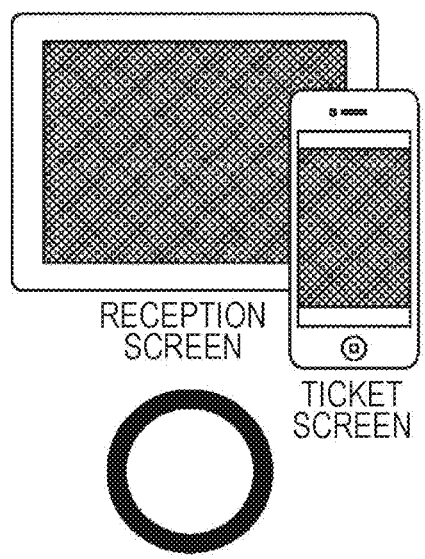
FIGS. 4A, 4B and 4C are views illustrating an electronic ticket checking method called ColorSync.
Figure 4B:
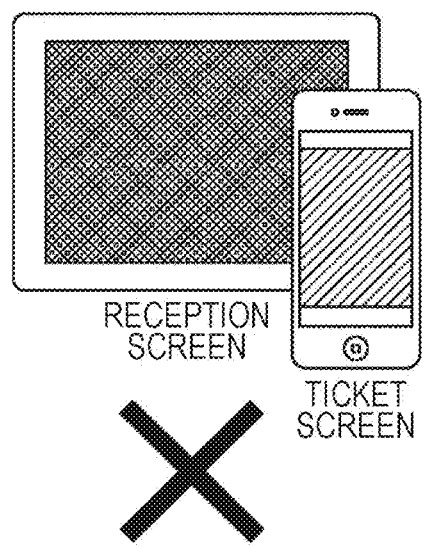
Figure 4C:
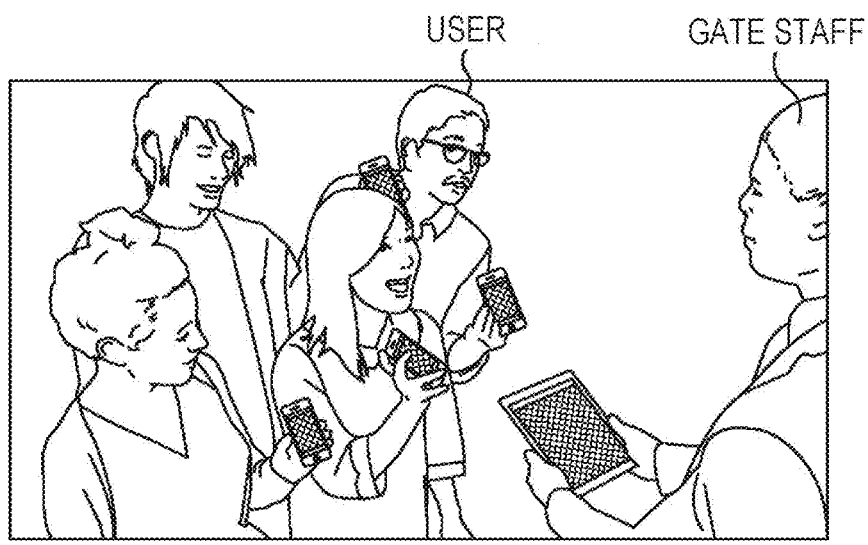

FIGS. 4A, 4B and 4C illustrate an electronic ticket check method called ColorSync.

(A process of) ColorSync starts in response to a start of a reception screen of ColorSync on a gate staff portable terminal by a gate staff, and a start of a ticket screen of ColorSync on a user portable terminal by a user.

In ColorSync, a color is displayed on both the reception screen of the gate staff and the ticket screen of the user. The color displayed on the reception screen and the color displayed on the ticket screen are changeable for each second in synchronization with each other. The electronic ticket of the user is determined as effective on the basis of agreement of color changes between the reception screen and the ticket screen. In case of agreement, the user is automatically allowed to check in (received). The gate staff confirms (effectiveness of) the electronic ticket on the basis of visual checking of the ticket screen.

FIG. 4A illustrates a state of agreement of color changes between the reception screen and the ticket screen, while FIG. 4B illustrates a state of disagreement of color changes between the reception screen and the ticket screen. FIG. 4C illustrates a state that a gate staff checks ticket screens displayed on portable terminals of users, i.e., a state that the gate staff checks whether or not color changes of the reception screen agree with color changes of the ticket screens.

Note that the color of the ticket screen of the user in ColorSync only changes in response to a start of the ticket screen by the user at an event site, and a start of a reception screen by the gate staff. In addition, the color of the ticket screen does not change in a case where a correct address of the event site is not set to the portable terminal, or where the reception screen is not started, for example.

Figure 5A:
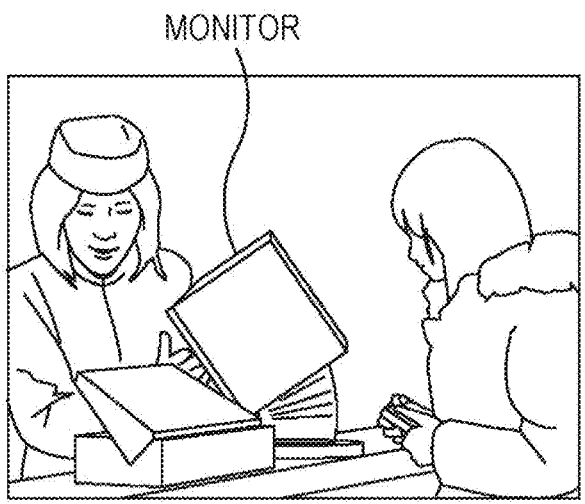
FIGS. 5A, 5B and 5C are views illustrating a ticket checking method combined with face authentication.
Figure 5B:
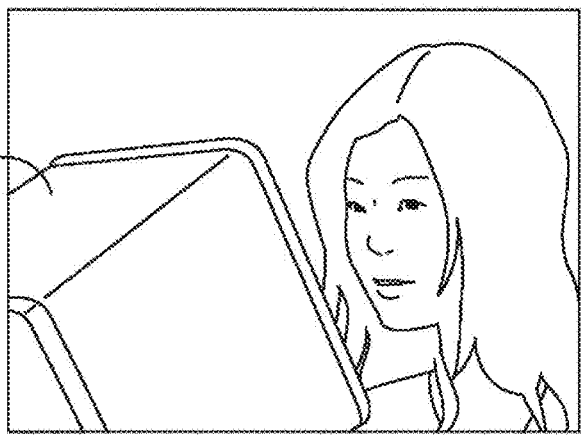
Figure 5C:
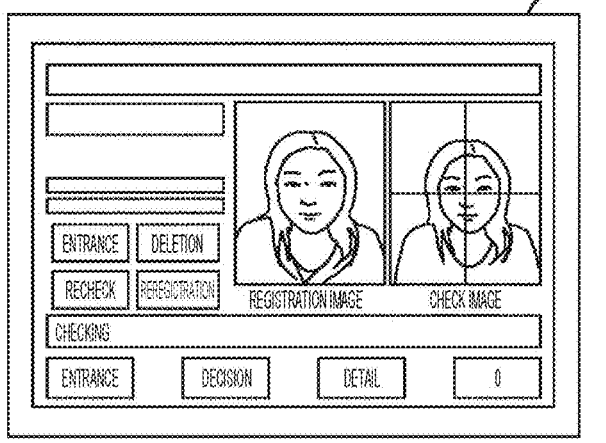

FIGS. 5A, 5B and 5C are views illustrating a ticket check method combined with face authentication.

For example, a face image of a user who has purchased an annual passport as a ticket is registered in an authentication system at the time of initial entrance of the user into a theme park. Then, after the registration, identification is checked with face authentication by using the face image registered at the initial entrance from the second entrance.

FIG. 5A illustrates a state of an entrance gate of a theme park. A monitor having an imaging function for face authentication is provided at the entrance gate.

For example, a QR code is added to an annual passport purchased by a user. At the time of initial entrance, the user allows a QR code reader to read the QR code. The user further turns the face toward the monitor having the imaging function for face authentication, and allows the monitor to capture a face image of the user.

Information about the QR code read by the reader, and the face image of the user captured by the monitor are registered in association with each other in an authentication system of the theme park.

From the second entrance, a face image of the user is captured by the monitor similarly to the initial entrance. Thereafter, identification is checked with face authentication based on the face image captured by the monitor and on the face image registered in the authentication system of the theme park.

FIG. 5B illustrates a state of image capturing of the face turned toward the monitor, while FIG. 5C illustrates a display screen on the monitor during face authentication.

Currently, there have been various demands concerning entrance into an event.

More specifically, a first demand included in the demands concerning entrance into an event is to allow simultaneous entrance (passage through entrance gates) of a large number of attendants.

An event size is variable for each event. The number of attendants per day may reach several tens of thousands in a large-scale event. In case of such a large-scale event, a large number of attendants rush to entrance gates and often cause congestion. Guidance for reducing the congestion has been a burden on the event management side. For reducing this burden, there has been a demand for increasing a flow amount through the entrance gates which form bottlenecks.

According to the ticket checking methods described with reference to FIGS. 2, 3, and 5, ticket reading and checking is needed for each user. In this case, a time of several seconds or longer is required for completion of this work even at a high handling speed.

In case of ColorSync illustrated in FIGS. 4A 4B and 4C, the gate staff is capable of simultaneously checking tickets of the plurality of users. In this case, the time required for ticket checking is shorter than the time for ticket checking by the methods described with reference to FIGS. 2A, 2B, 2C, 3A, 3B, 3C, 5A, 5B and 5C. According to ColorSync, however, the gate staff needs to visually check color changes on the ticket screen for each second. The users are therefore asked to stop at the entrance gate for a certain period. Accordingly, a time is required for ticket checking even though this time is shorter than the time for ticket checking in the example of FIGS. 2A, 2B, 2C, 3A, 3B, 3C, 5A, 5B and 5C.

On the other hand, a second demand included in the demands concerning entrance into an event or the like is to eliminate confusion in a case where lanes of different classes are disposed adjacent to each other.

For example, entrance gates may be built for each class in an event which has different seat classes such as ordinary seats and special seats, and therefore sets different ticket prices. In this case, lanes for entrance gates provided for respective different classes may be disposed adjacent to each other for a structural reason of the event site.

In case of lanes provided for entrance gates of respective different classes and disposed adjacent to each other, ticket checking needs to be completed without confusion of classes between the adjoining lanes.

According to the methods using paper tickets and electronic ticket readers provided for each lane, confusion of classes between the adjoining lanes is avoidable as long as no mistake is made by a gate staff.

However, in case of adoption of a method which specifies a user position and checks whether the user is waiting along an appropriate lane on the basis of the user position, it is difficult to expect sufficient accuracy for identifying the lane corresponding to the user position by use of wireless communication, global positioning system (GPS), internet communication or the like for specifying the user position.

On the other hand, a third demand included in the demands concerning entrance into an event or the like is to prohibit or limit re-entrance.

Re-entrance with a ticket already used may be prohibited in a certain event. Accordingly, there has been a demand for setting prohibition of re-entrance with a ticket.

Prohibition of re-entrance with an electronic ticket requires adoption of an authentication technology which determines whether or not an electronic ticket is a ticket already used (once).

In addition, there has also been a demand for limiting the maximum number of times of entrance (re-entrance) with a ticket to a certain number of times, i.e., N number of times more than once.

In case of a paper ticket, for example, a gate staff passes a stub removed from a ticket to a user, and admits the user to re-enter when the user returns the stub to the gate staff for re-entrance. In this case, however, limitation of the number of times of re-entrance is difficult on the basis of a return of a stub for re-entrance admittance.

On the other hand, according to the electronic ticket checking method which uses a reader for reading an electronic ticket, re-entrance is determined at the time of re-reading of an electronic ticket on the basis of information indicating passage of the user through the entrance gate and accumulated in a management server at the time of reading of the electronic ticket.

In case of ColorSync of FIGS. 4A, 4B and 4C, for example, re-entrance or not may be determined on the basis of a result of authentication accumulated in the management server which accumulates results of authentication of electronic tickets concerning agreement or disagreement of color changes between the reception screen of the gate staff and the ticket screen of the user.

In this case, however, a result of authentication is accumulated in the management server in accordance with electronic ticket authentication performed only with starts of the reception screen of the gate staff and the ticket screen of the user in the event site, regardless of whether or not the user has actually passed through the entrance gate. Accordingly, there is no relationship, in a strict sense, between execution of authentication and execution of electronic ticket authentication.

A fourth demand included in the demands concerning entrance into an event or the like is to prohibit sharing of a ticket.

Sharing of a ticket may be prohibited in a certain event even in a state of admittance of re-entrance. For prohibiting sharing of a ticket, whether or not a ticket is used only by an identical user needs to be determined.

According to the method using a paper ticket or checking validity of an electronic ticket only on the basis of a QR code, it is difficult to determine whether or not a ticket is used only by an identical user.

The ticket checking method combined with face authentication as described with reference to FIGS. 5A, 5B and 5C is capable of prohibiting sharing of a ticket, and is now practically used for an annual passport of a theme park.

A fifth demand included in the demands concerning entrance into an event or the like is to build temporary entrance gates at low cost.

An event may be held at a general-purpose hall, a stadium, or like facilities. These facilities do not have permanent entrance gates, wherefore temporary entrance gates need to be built for each event, and used only for the corresponding event.

It is therefore preferable that each entrance gate is constituted by most inexpensive general-purpose materials, and easily assembled or removed.

According to the ticket checking method combined with face authentication as described with reference to FIGS. 5A, 5B and 5C, for example, a dedicated monitor for face authentication is needed for each entrance gate. In addition, a server or the like for managing the respective monitors is required. Accordingly, this method is applicable to a theme park having permanent entrance gates, but is difficult to adopt for temporary entrance gates.

Described hereinbelow is an entrance gate system capable of meeting one or more of the foregoing first through fifth demands.

<Entrance Gate System of Present Technology in First Embodiment>

Figure 6:
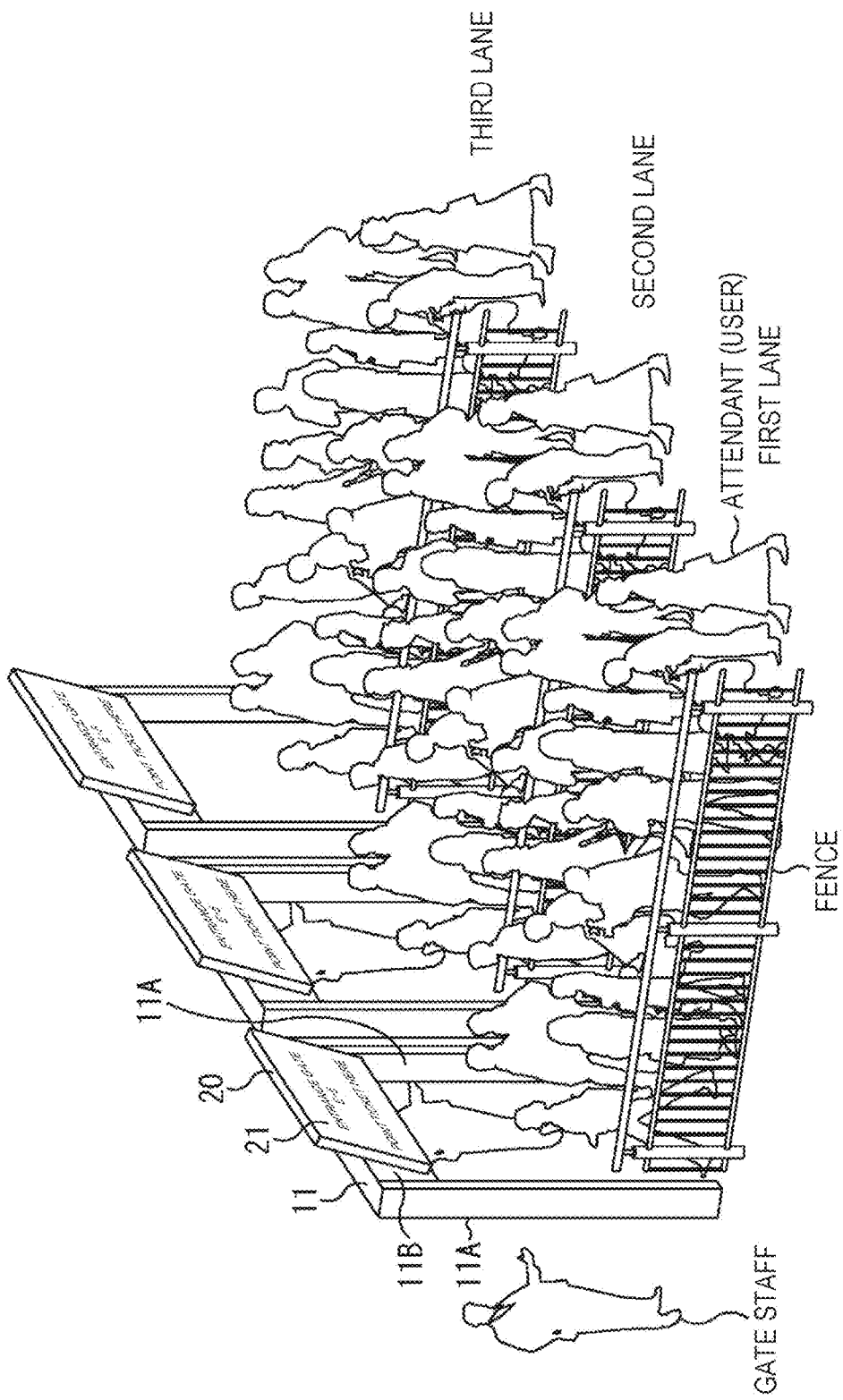
FIG. 6 is a view illustrating a configuration example of an entrance gate system to which the present technology has been applied according to a first embodiment.

FIG. 6 is a configuration example of an entrance gate system to which the present technology has been applied according to a first embodiment.

The entrance gate system illustrated in FIG. 6 includes three entrance gates 11 having an identical configuration and disposed in parallel, and fences for forming three lanes of a first lane, a second lane, and a third lane. The respective lanes may be provided in correspondence with different classes of electronic tickets (such as special seats and ordinary seats), or all provided for an identical class.

Each of the entrance gates 11 is constituted by two supports 11A, and a beam 11B attached to upper ends of the two supports 11A to form a gate structure. In addition, each of the entrance gates 11 has a width sufficient for allowing simultaneous passage of a plurality of users through the entrance gate 11.

In FIG. 6, users corresponding to attendants form a line for each lane toward the corresponding entrance gate 11.

A gate display device 20 is provided on the beam 11B of each of the entrance gates 11. The gate display device 20 includes a display unit 21 which displays various types of images. The display unit 21 is disposed on the corresponding entrance gate 11 at a position easily visible from the users forming the line toward the corresponding entrance gate 11. The display unit 21 is constituted by a liquid crystal display, for example.

Here, while each of the entrance gate 11 in FIG. 6 has a gate structure as described above, the structure of each of the entrance gates 11 may have structures other than a gate structure as long as the display unit 21 of each of the gate display devices 20 is disposed in a position easily visible from the users.

One gate staff is deployed for each of the entrance gates 11. As detailed below, each of the users passes (enters) through the corresponding entrance gate 11 while presenting a portable terminal 30 (FIG. 7) carried by the user and storing an electronic ticket. The gate staff stands at a position from which the portable terminal 30 presented by the user is easily recognizable.

Figure 7:
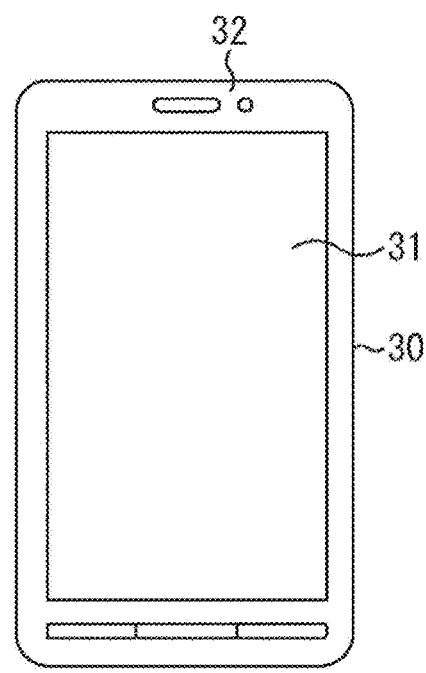
FIG. 7 is a plan view illustrating a configuration example of a portable terminal 30 carried by a user.

FIG. 7 is a plan view illustrating a configuration example of the portable terminal 30 carried by the user.

The portable terminal 30 is constituted by a smartphone, a tablet-type device or the like, for example, and includes a touch panel 31 extending through a large area of the front face, and configured to receive an operation input and display an image. The portable terminal 30 further includes a camera 32 disposed on a face identical to the face of the touch panel 31 of the portable terminal 30.

<Example of Procedures for Ticket Authentication>

FIG. 8 is a view illustrating an example of procedures for ticket authentication performed by the entrance gate system in FIG. 6.

The user downloads a ticket application for realizing ticket authentication of electronic tickets, and installs the ticket application in the portable terminal 30. The user further purchases an electronic ticket from a site such as a site on the Internet, and retains (stores) the electronic ticket in the portable terminal 30.

Thereafter, the user stands in a line of an appropriate lane, such as a lane associated with the class of the electronic ticket, while carrying the portable terminal 30 retaining the electronic ticket. The user starts the ticket application of the portable terminal 30 when coming close to the entrance gate 11.

The ticket application of the portable terminal 30 retaining a list of electronic tickets displays the list on the touch panel 31 of the portable terminal 30. The user operates the touch panel 31 to select an appropriate electronic ticket, i.e., a ticket for an event associated with the entrance gate 11 of the line of the user, from the list of the tickets displayed on the touch panel 31.

When the user selects the electronic ticket, a standby image of authentication (authentication standby image) is displayed on the touch panel 31. The electronic ticket selected by the user is hereinafter also referred to as a ticket of interest.

When the authentication standby image is displayed on the touch panel 31, the ticket application starts the camera 32.

After the start of the camera 32, the user walks toward the entrance gate 11 of the lane of the user while pointing the camera 32 to (the display unit 21 of) the gate display device 20 provided at the entrance gate 11 in step S1.

At this time, the camera 32 of the portable terminal 30 captures an image of a display image formed on the display unit 21 of the gate display device 20 in step S2.

The display unit 21 of the gate display device 20 displays a superimposition image constituted by a predetermined image, and identification (ID) information superimposed on the predetermined image to be used for determination of admittance or non-admittance of entrance with the electronic ticket.

Here, the ID information herein superimposed on the predetermined image indicates time radiance variations not noticeable by a sense of vision of a human.

In addition, adopted in FIG. 8 as the predetermined image on which the ID information is superimposed is an image which shows a character string "ENTRANCE GATE S-5" for identification of the entrance gate 11, and a message "POINT TICKET HERE" for urging the user to point the camera 32 of the portable terminal 30 to the gate display device 20, as a predetermined text displayed on a background image in one color without pattern for notifying the user about information concerning the entrance gate 11 in a comprehensible manner.

As described above, the gate display device 20 displays the superimposition image on the display unit 21 to provide the image for the user. Accordingly, the gate display device 20 functions as a providing device for providing a superimposition image.

The ticket application of the portable terminal 30 extracts ID information from an image captured by the camera 32 and showing the superimposition image displayed on the display unit 21 of the gate display device 20.

The ticket application further performs authentication for the ticket of interest on the basis of the ticket of interest and the ID information to determine whether or not entrance is to be admitted with the ticket of interest as entrance admittance/non-admittance determination.

Thereafter, the ticket application displays a result image indicating a result of the entrance admittance/non-admittance determination on the touch panel 31 of the portable terminal 30.

The result image is constituted by an OK image indicating admittance of entrance, and an NG image indicating non admittance of entrance.

In case of agreement between the ID information and the ticket of interest, admittance of entrance is determined in the entrance admittance/non-admittance determination. In this case, the OK image is displayed on the touch panel 31.

In case of disagreement between the ID information and the ticket of interest, however, non-admittance of entrance is determined in the entrance admittance/non-admittance determination. In this case, the NG image is displayed on the touch panel 31.

In step S3, the user walks toward the entrance gate 11 while presenting the portable terminal 30 which displays the OK image or NG image as the result image on the touch panel 31, and shows the result image to the gate staff.

As illustrated in FIG. 7, the touch panel 31 which displays the result image, and the camera 32 which captures an image of the superimposition image displayed on the display unit 21 of the gate display device 20 are disposed on the same face of the portable terminal 30. Accordingly, the user is capable of presenting the result image displayed on the touch panel 31 to the gate staff deployed at the entrance gate 11 without the necessity of switching the hand holding the portable terminal 30 which has captured an image of the superimposition image to the opposite hand to present the result image displayed on the touch panel 31.

As described above, the gate staff checks the result of authentication of the ticket of interest, and also admittance or non-admittance of entrance on the basis of the result image presented by the user to the gate staff.

The gate staff checks the result image, and allows the user walking toward the entrance gate 11 to pass through the entrance gate 11 in case of the OK image presented as the result image.

On the other hand, the gate staff temporarily stops the user and guides the user in an appropriate manner in case of the NG image or the like presented as the result image instead of the OK image.

The portable terminal 30 comes into a state unable to capture an image of the superimposition image and extract the ID information superimposed on the superimposition image after the user carrying the portable terminal 30 passes through the entrance gate 11.

In the state unable to extract the ID information after the display of the result image, the ticket application deletes the result image displayed on the touch panel 31 after an elapse of a predetermined time from the state unable to extract the ID information.

The user ends the ticket application after passage through the entrance gate 11 in step S4.

Figure 9A:
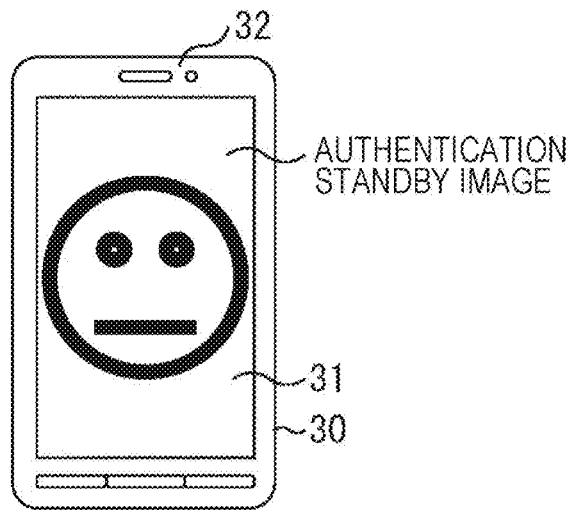
FIGS. 9A, 9B and 9C are views illustrating display examples of an authentication standby image and a result image.
Figure 9B:
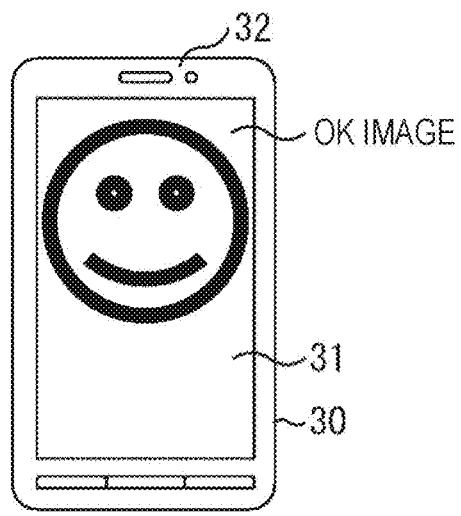
Figure 9C:
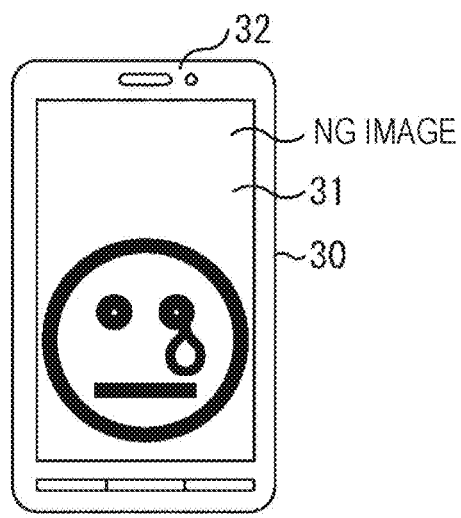

FIGS. 9A, 9B and 9C are views illustrating display examples of the authentication standby image and the result image.

FIG. 9A is a view illustrating an example of the authentication standby image.

As described above, the authentication standby image is displayed on the touch panel 31 when the user selects an electronic ticket corresponding to a ticket of interest, for example.

FIG. 9B is a view illustrating an example of the OK image, while FIG. 9C is a view illustrating an example of the NG image.

As described above, the OK image is displayed in case of agreement between ID information extracted from the captured image, and the ticket of interest (i.e., success of authentication). The NG image is displayed in case of disagreement between the ID information and the ticket of interest (failure of authentication).

Note that the authentication standby image and the result image may be constituted by any images such as still images, moving images (animations), and texts.

<Configuration Example of Hardware of Gate Display Device 20>

Figure 10:
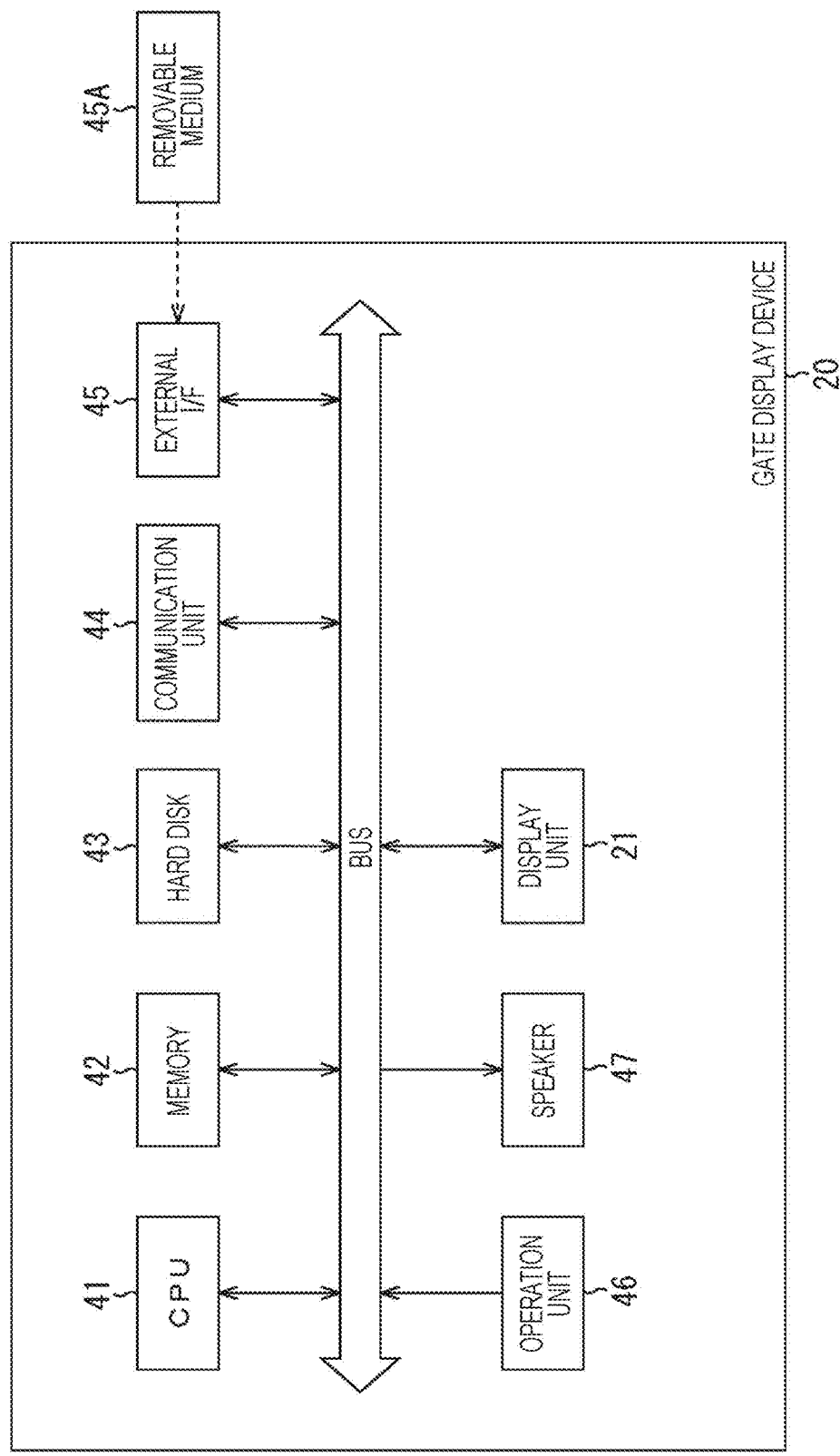
FIG. 10 is a block diagram showing a configuration example of hardware of a gate display device 20.

FIG. 10 is a block diagram showing a configuration example of hardware of the gate display device 20.

For example, the gate display device 20 has a configuration similar to a configuration of a computer.

More specifically, the gate display device 20 is constituted by the display unit 21, a central processing unit (CPU) 41, a memory 42, a hard disk 43, a communication unit 44, an external interface (I/F) 45, an operation unit 46, and a speaker 47 connected to each other via a bus, for example.

The CPU 41 executes programs installed in the hard disk 43 to control respective blocks constituting the gate display device 20, and perform other various types of processes.

The memory 42 is a random access memory (RAM), for example, and temporarily stores data (including programs) necessary for performing operations by the CPU 41.

The hard disk 43 stores the programs executed by the CPU 41, and necessary data.

Note that at least a gate application (program) is installed in the hard disk 43. A computer functioning as the gate display device 20 operates as the gate display device 20 under the gate application installed in the hard disk 43 and executed by the CPU 41.

The communication unit 44 controls wireless or wired communication with a network such as the Internet.

The external I/F 45 functions as an interface with a not-shown external device, or a removable medium 45A such as a memory card.

The operation unit 46 is operated by an operator or the like who manages the gate display device 20, and outputs an operation signal indicating an operation by the operator to the bus.

The speaker 47 outputs a sound corresponding to audio data supplied from the bus.

The gate display device 20 thus constructed functions as the gate display device 20 under the gate application installed in the hard disk 43 and executed by the CPU 41.

The gate application may be installed in the hard disk 43 beforehand, or stored (recorded) in the removable medium 45A to be installed from the removable medium 45A into the gate display device 20 via the external I/F 45.

Alternatively, the gate application may be downloaded from a communication network or a broadcast network via the communication unit 44, and installed into the gate display device 20.

The gate application may be updated in a manner similar to the manner of installation of the gate application.

<Configuration Example of Hardware of Portable Terminal 30>

Figure 11:
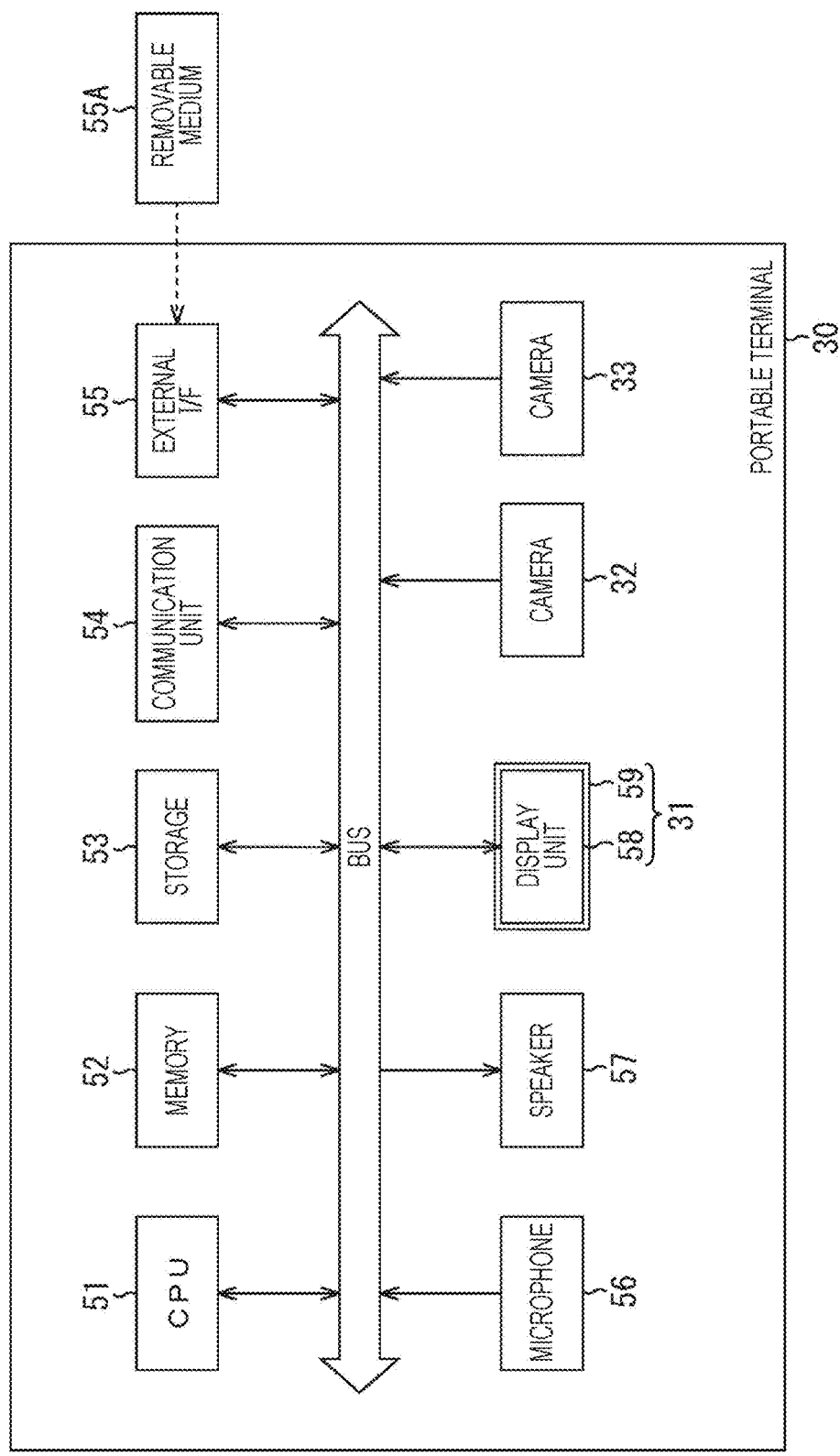
FIG. 11 is a block diagram showing a configuration example of hardware of the portable terminal 30.

FIG. 11 is a block diagram showing a configuration example of hardware of the portable terminal 30.

For example, portable terminal 30 has a configuration similar to a configuration of a computer.

More specifically, for example, the portable terminal 30 includes the camera 32 and a camera 33, a CPU 51, a memory 52, a storage 53, a communication unit 54, an external I/F 55, a microphone 56, a speaker 57, and a display unit 58 and a position detection mechanism 59 constituting the touch panel 31. All of these components are connected to each other via a bus.

Each of the cameras 32 and 33 captures an image, and outputs a captured image (image data indicating captured image) thus formed to the bus.

The camera 32 herein is provided on the front face (front surface) of the portable terminal 30 corresponding to the face identical to the face of the touch panel 31, as described with reference to FIG. 7. The camera 33 is provided on the rear face (back surface) of the portable terminal 30 corresponding to the face opposite to the face of the touch panel 31.

The CPU 51 executes the programs installed in the storage 53 to control respective blocks constituting the portable terminal 30, and perform other various types of processes.

The memory 42 is a RAM, for example, and temporarily stores data (including programs) necessary for performing operations by the CPU 51.

The storage 53 is a non-volatile memory, for example, and stores the programs executed by the CPU 51, and necessary data.

Note that at least a ticket application (program) is installed in the storage 53. A computer functioning as the portable terminal 30 performs various types of processes concerning electronic tickets (electronic ticket processes) under the ticket application installed in the storage 53 and executed by the CPU 51.

The communication unit 54 controls wireless or wired communication with a network such as the Internet.

The external I/F 55 functions as an interface with a not-shown external device, or a removable medium 55A such as a memory card.

The microphone 56 converts voices generated from the user or other sounds into audio data given as electric signals, and outputs the audio data to the bus.

The speaker 57 outputs sounds corresponding to the audio data supplied from the bus.

The display unit 58 constituted by, for example, a liquid crystal display or the like displays an image corresponding to image data supplied from the bus.

The position detection mechanism 59 formed integrally with the display unit 58 constitutes the touch panel 31. The position detection mechanism 59 detects a touch position of a finger or the like of the user on the touch panel 31, and outputs the detected touch position to the bus.

The portable terminal 30 constructed as above performs electronic ticket processes under the ticket application installed in the storage 53 and executed by the CPU 51.

The ticket application may be installed in the storage 53 beforehand, or stored in the removable medium 55A to be installed from the removable medium 55A into the portable terminal 30 via the external I/F 55.

Alternatively, the ticket application may be downloaded from a communication network or a broadcast network via the communication unit 54, and installed into the portable terminal 30.

The ticket application may be updated in a manner similar to the manner of installation of the ticket application.

<Functional Configuration Example of Gate Display Device 20 and Portable Terminal 30>

FIG. 12 is a block diagram showing a functional configuration example of the gate display device 20 and the portable terminal 30.

The functional configuration example of the gate display device 20 in FIG. 12 is (virtually) realized under the gate application executed by the CPU 41 in FIG. 10. Similarly, the functional configuration example of the portable terminal 30 in FIG. 12 is realized under the ticket application executed by the CPU 51 in FIG. 11.

The gate display device 20 in FIG. 12 includes the display unit 21, an ID storage unit 71, an encoding unit 72, and a control unit 73.

As described above, the display unit 21 is constituted by a liquid crystal display, for example, and includes a liquid crystal panel 21A and a backlight 21B.

For example, the liquid crystal panel 21A receives an original image corresponding to the predetermined image which contains the predetermined text displayed on the background image in one color without pattern as described with reference to FIG. 8. The liquid crystal panel 21A is driven in accordance with the original image.

The backlight 21B emits light to apply the light to the liquid crystal panel 21A. The display unit 21 constituted by the liquid crystal panel 21A and the backlight 21B is therefore allowed to display the original image.

The ID information storage unit 71, the encoding unit 72, and the control unit 73 constitute the gate application (are (virtually) realized under gate application).

The ID information storage unit 71 stores respective items of ID information uniquely allocated to the corresponding entrance gates 11.

The encoding unit 72 encodes ID information stored in the ID information storage unit 71 by modulating the ID information.

More specifically, the encoding unit 72 encodes the ID information by modulating phases of sine waves in accordance with the ID information, for example.

The encoding unit 72 supplies encoded information obtained by the encoding to the control unit 73.

The control unit 73 supplies control signals to the backlight 21B to control radiance of light emitted from the backlight 21B on the basis of the encoded information supplied from the encoding unit 72, thereby superimposing the ID information (encoded ID information) indicating time radiance variations on the original image.

More specifically, the control unit 73 superimposes the ID information indicating time radiance variations on the original image by varying (modulating) radiance of the backlight 21B in accordance with the encoded information at a speed not perceptible by a sense of vision of a human. As a result, the display unit 21 displays a superimposition image on which the ID information indicating time radiance variations is superimposed.

The superimposition image displayed on the display unit 21 is visible light, wherefore the ID information (encoded ID information) superimposed on the superimposition image is transmitted as information via so-called visible light communication.

The portable terminal 30 in FIG. 12 includes the touch panel 31 (display unit 58 of touch panel 31), the camera 32, a camera driver 81, an extraction unit 82, a decoding unit 83, an entrance admittance/non-admittance determination unit 84, an electronic ticket storage unit 85, a display driver 86, and a controller 87.

The camera driver 81 through the controller 87 constitute a ticket application (are (virtually) realized under ticket application).

The camera driver 81 controls image capturing by the camera 32. The camera driver 81 supplies, to the extraction unit 82, a captured image which shows the superimposition image displayed on the display unit 21 and has been captured by the camera 32.

The extraction unit 82 extracts the encoded information (ID information) superimposed on the captured image received from the camera driver 81, and supplies the extracted encoded information to the decoding unit 83.

The extraction unit 82 further supplies, to the controller 87, success or failure of extraction of the encoded information from the captured image.

The decoding unit 83 decodes (demodulates) the encoded information received from the extraction unit 82 into ID information, and supplies the ID information to the entrance admittance/non-admittance determination unit 84.

The entrance admittance/non-admittance determination unit 84 performs authentication of a ticket of interest selected by the user from electronic tickets stored in the electronic ticket storage unit 85 on the basis of the ID information supplied from the decoding unit 83, and on the ticket of interest to determine admittance or non-admittance of entrance with the ticket of interest as entrance admittance/non-admittance determination.

The entrance admittance/non-admittance determination unit 84 supplies a result of the entrance admittance/non-admittance determination to the controller 87.

Note that the entrance admittance/non-admittance determination unit 84 increments the number of times of use associated with the ticket of interest and stored in the electronic ticket storage unit 85 by one in a case where the result of the entrance admittance/non-admittance determination indicates admittance of entrance.

The electronic ticket storage unit 85 stores electronic tickets purchased by the user from a site or the like via on-line purchase, for example.

The electronic tickets herein may be stored in the electronic ticket storage unit 85 in association with the number of times of use of the electronic tickets. In addition, the electronic tickets may be stored in association with biotic information about the user, and other necessary information, for example, as described below.

Each of the electronic tickets further contains attribute information and a ticket image.

The attribute information contains correspondence information which corresponds to ID information. Electronic ticket authentication determines whether or not correspondence information agrees with ID information extracted from a captured image. Correspondence information may be constituted by information identical to ID information in a simplified example. In this case, electronic ticket authentication determines whether or not correspondence information and ID information agree with each other.

The ticket image contains an authentication standby image described with reference to FIGS. 8 and 9, and OK image and NG image corresponding to result images.

An event organizer may designate, as the ticket image, particularly as the result image, an image on the basis of which the gate staff easily determines admittance or non-admittance of entrance.

The result image, particularly the OK image may be constituted by an image which contains a pattern not easily copied on the spot to prevent illegal copy of the OK image and illegal entrance.

The display driver 86 is a display control unit which controls display of the display unit 58 constituting the touch panel 31, and displays a ticket image stored in the electronic ticket storage unit 85, i.e., the authentication standby image and the OK image or NG image as the result images, on the touch panel 31 (display unit 58).

The controller 87 controls respective blocks constituting the ticket application on the basis of an operation input to the touch panel 31 from the user, success or failure of extraction of ID information (encoded ID information) supplied from the extraction unit 82, a determination result of entrance admittance/non-admittance determination supplied from the entrance admittance/non-admittance determination unit 84, and others.

Note that control lines for controlling the respective blocks constituting the ticket application by the controller 87 are not shown in the figure to avoid complication of the figure.

<Processes by Gate Display Device 20 and Portable Terminal 30>

Figure 13:
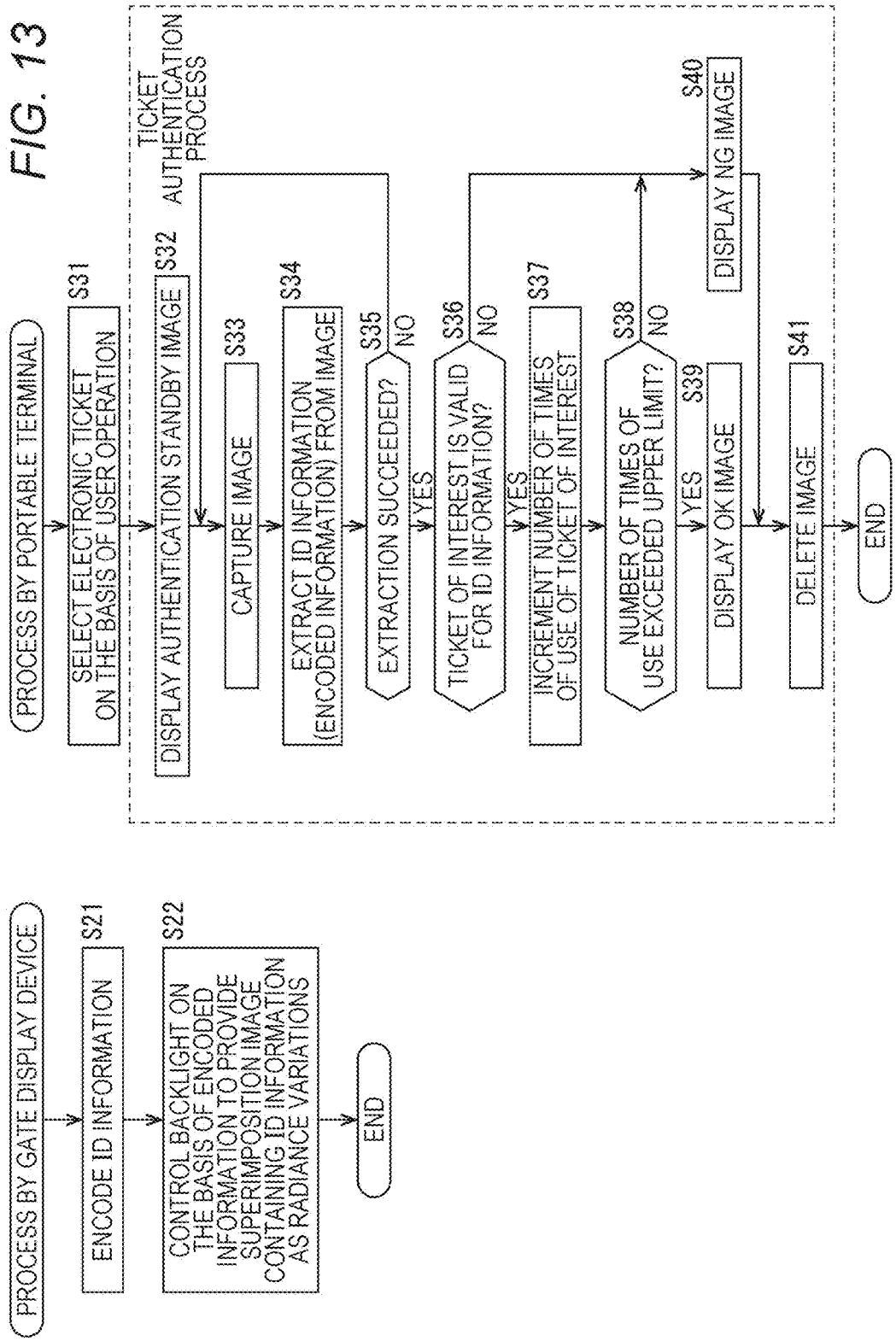
FIG. 13 is a flowchart showing an example of processes performed by the gate display device 20 and the portable terminal 30.

FIG. 13 is a flowchart showing an example of processes performed by the gate display device 20 and the portable terminal 30 in FIG. 12.

In step S21, the encoding unit 72 of the gate display device 20 modulates ID information stored in the ID information storage unit 71 to encode the ID information, and supplies encoded information obtained thereby to the control unit 73. Thereafter, the process proceeds to step S22.

In step S22, the control unit 73 controls radiance of light emitted from the backlight 21B on the basis of the encoded information received from the encoding unit 72 to superimpose the ID information (encoded information) on an original image displayed on the liquid crystal panel 21A.

As a result, a superimposition image on which the ID information indicating time radiance variations is superimposed is displayed on the display unit 21 of the gate display device 20, and presented to (a large number of) users standing in the line of the entrance gate 11.

On the other hand, the electronic ticket storage unit 85 of the portable terminal 30 carried by the user stores electronic tickets purchased from a site or the like. In this case, the user views the superimposition image displayed on the gate display device 20 (display unit 21 of gate display device 20), joins the line along the lane of the appropriate entrance gate (entrance gate 11 associated with the class of the purchased electronic ticket), and walks toward the entrance gate 11.

When coming close to the entrance gate 11, the user operates the touch panel 31 of the portable terminal 30 to start the ticket application.

With the start of the ticket application, the controller 87 allows the display driver 86 to display a list of electronic tickets stored in the electronic ticket storage unit 85 on the touch panel 31.

Thereafter, the user operates the touch panel 31 to select an electronic ticket necessary for entrance through the entrance gate 11 from the list of the electronic tickets displayed on the touch panel 31. In this case, the controller 87 designates the electronic ticket selected by the user as a ticket of interest in step S31.

Subsequently, the process proceeds from step S31 to step S32, whereafter a ticket authentication process for authentication of the ticket of interest (steps S32 through S41) is performed.

More specifically, in the ticket authentication process, the controller 87 allows the display driver 86 to display the authentication standby image on the touch panel 31 in step S32. Thereafter, the process proceeds to step S33.

In step S33, the controller 87 allows the camera driver 81 to start capturing an image by the camera 32 provided on the front face identical to the face of the touch panel 31.

Image capturing by the camera 32 starts in this manner. When the user views a text in a superimposition image displayed on the gate display device 20 and points the camera 32 to the gate display device 20, the camera 32 captures an image of the superimposition image displayed on the gate display device 20. The captured image acquired by the camera 32 is supplied to the extraction unit 82 via the camera driver 81.

ID information is thus acquired as a captured image by the portable terminal 30 (in the form superimposed on the captured image).

In subsequent step S34, the extraction unit 82 extracts encoded information (encoded ID information) from the captured image supplied via the camera driver 81, and supplies success or failure information indicating success or failure of the extraction to the controller 87. Thereafter, the process proceeds to step S35.

In step S35, the controller 87 determines success or failure of extraction of the encoded information (ID information) on the basis of the success or failure information received from the extraction unit 82.

In case of determination that extraction of the encoded information has failed in step S35, the process returns to step S33. Thereafter, similar processes are repeated.

In addition, in case of determination that extraction of the encoded information has succeeded in step S35, the controller 87 allows the extraction unit 82 to supply the encoded information to the decoding unit 83.

The decoding unit 83 decodes the encoded information received from the extraction unit 82 into ID information, and supplies the ID information to the entrance admittance/non-admittance determination unit 84. Thereafter the process proceeds from step S35 to step S36.

In step S36, the entrance admittance/non-admittance determination unit 84 performs authentication of the ticket of interest, i.e., determines whether or not the ticket of interest is valid for the ID information received from the decoding unit 83, on the basis of the ID information supplied from the decoding unit 83, and the ticket of interest included in the electronic tickets stored in the electronic ticket storage unit 85.

In case of determination that the ticket of interest is valid for the ID information, i.e., in case of success of authentication of the ticket of interest in step S36, the process proceeds to step S37.

In step S37, the entrance admittance/non-admittance determination unit 84 increments the number of times of use associated with the ticket of interest and stored in the electronic ticket storage unit 85 by one. Thereafter, the process proceeds to step S38.

In step S38, the entrance admittance/non-admittance determination unit 84 determines whether or not the number of times of use associated with the ticket of interest and stored in the electronic ticket storage unit 85 exceeds an upper limit of the number of times of use.

The upper limit of the number of times of use of the ticket of interest herein is contained in attribute information about the ticket of interest, for example.

In case of determination that the number of times of use associated with the ticket of interest does not exceed the upper limit in step S38, the entrance admittance/non-admittance determination unit 84 determines admittance of entrance with the ticket of interest as entrance admittance/non-admittance determination. Thereafter, the entrance admittance/non-admittance determination unit 84 supplies, to the controller 87, the determination result indicating admittance of entrance with the ticket of interest. Thereafter, the process proceeds to step S39.

In step S39, the controller 87 allows the display driver 86 to display, on the touch panel 31, the OK image contained in the ticket image of the ticket of interest stored in the electronic ticket storage unit 85 on the basis of the determination result received from the entrance admittance/non-admittance determination unit 84 and indicating admittance of entrance with the ticket of interest.

The user continues walking toward the entrance gate 11, and presents the OK image displayed on the touch panel 31 to the gate staff for checking.

The gate staff is located close to the entrance gate 11. The camera 32 which captures an image of the superimposition image displayed on the gate display device 20 is provided on the front face identical to the face of the touch panel 31 where the OK image is displayed to be presented to the gate staff. Accordingly, the user is capable of presenting the OK image displayed on the touch panel 31 to the gate staff without the necessity of switching the hand holding the portable terminal 30 to the opposite hand to show the OK image.

The gate staff having confirmed the OK image displayed on the portable terminal 30 (touch panel 31 of portable terminal 30) carried by the user allows the user to pass through the entrance gate 11.

After the user passes through the entrance gate 11, the portable terminal 30 (camera 32 of portable terminal 30) comes into a state unable to capture an image of the superimposition image. In this case, the extraction unit 82 unable to extract encoded information supplies success/failure information indicating failure of extraction of encoded information to the controller 87.

The controller 87 having received the success/failure information indicating failure of extraction of the encoded information from the extraction unit 82 after display of the OK image on the touch panel 31 recognizes (detects) the state unable to extract the encoded information. Then, after an elapse of a predetermined time from recognition of the state unable to extract the encoded information, the controller 87 allows the display driver 86 to delete the OK image displayed on the touch panel 31 in step S41.

On the other hand, in case of determination that the ticket of interest is not valid for the ID information in step S36, i.e., in case of failure of authentication of the ticket of interest, the entrance admittance/non-admittance determination unit 84 determines non-admittance of entrance with the ticket of interest as entrance admittance/non-admittance determination. In this case, the entrance admittance/non-admittance determination unit 84 supplies a result of non-admittance of entrance with the ticket of interest to the controller 87. Thereafter, the process proceeds to step S40.

The entrance admittance/non-admittance determination unit 84 also determines non-admittance of entrance with the ticket of interest as entrance admittance/non-admittance determination in case of determination that the number of times of use associated with the ticket of interest exceeds the upper limit in step S38. In this case, the entrance admittance/non-admittance determination unit 84 supplies a result of non-admittance of entrance with the ticket of interest to the controller 87. Thereafter, the process proceeds to step S40.

In step S40, the controller 87 allows the display driver 86 to display, on the touch panel 31, the NG image contained in the ticket image of the ticket of interest stored in the electronic ticket storage unit 85 in accordance with the result of determination received from the entrance admittance/non-admittance determination unit 84 and indicating non-admittance of entrance with the ticket of interest.

The gate staff having confirmed the NG image displayed on the portable terminal 30 (touch panel 31 of portable terminal 30) carried by the user temporarily stops the user, and guides the user in an appropriate manner.

The user stopped by the gate staff suspends presentation of the camera 32 toward the gate display device 20. As a result, the extraction unit 82 comes to a state unable to extract encoded information, and supplies success/failure information indicating failure of extraction of encoded information to the controller 87.

The controller 87 having received the failure information indicating failure of extraction of encoded information from the extraction unit 82 after display of the NG image on the touch panel 31 recognizes the state unable to extract encoded information. Then, after an elapse of a predetermined time from recognition of the state unable to extract encoded information, the controller 87 allows the display driver 86 to delete the NG image displayed on the touch panel 31 in step S41.

After deletion of the OK image or the NG image in step S41, the user ends the ticket application.

<Behaviors of User and Processes by Portable Terminal 30>

Figure 14:
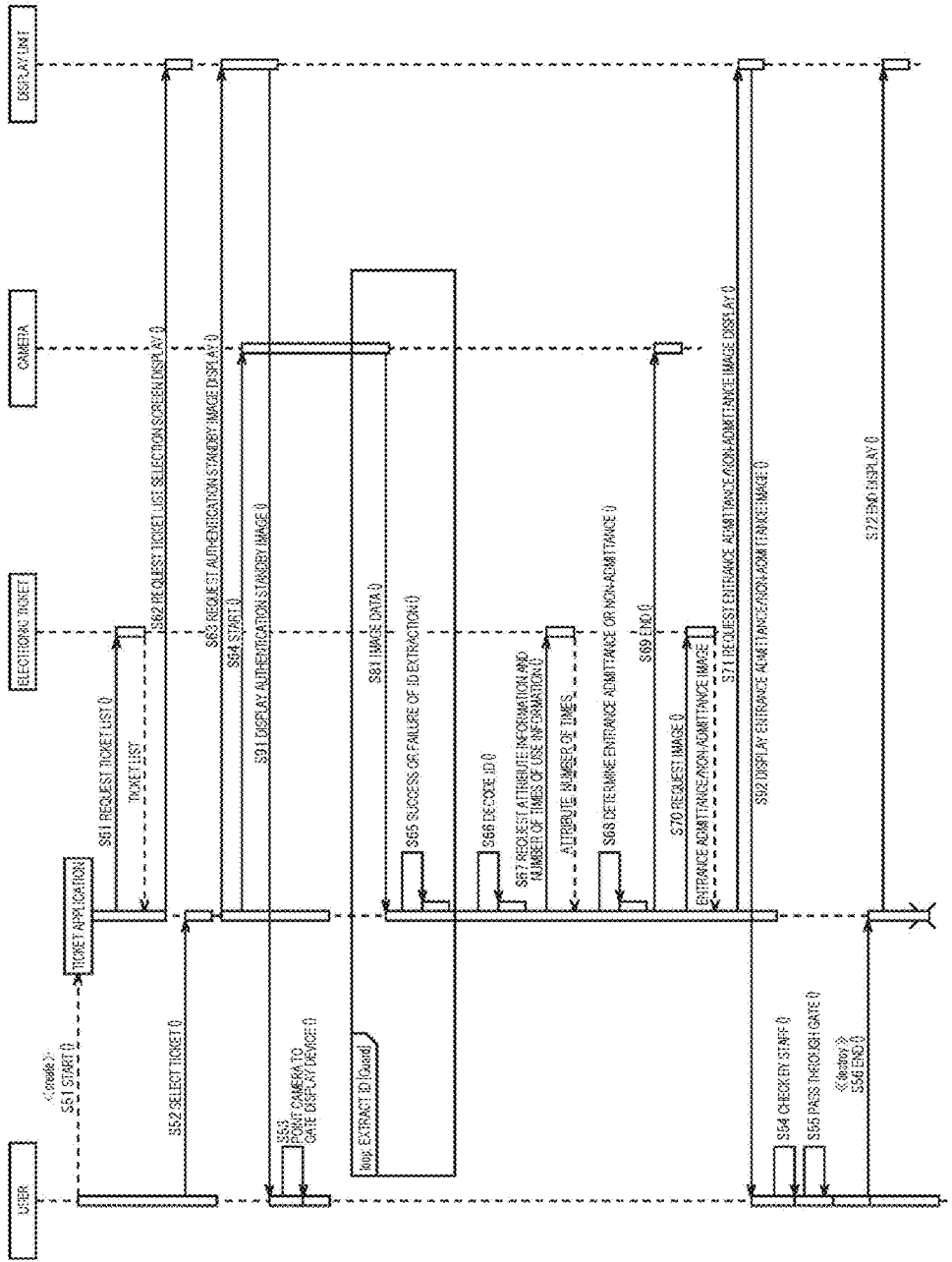
FIG. 14 is a sequence diagram showing an example of behaviors of the user and processes performed by the portable terminal 30.

FIG. 14 is a sequence diagram showing an example of behaviors of the user and processes performed by the portable terminal 30.

In step S51, the user starts the ticket application.

The ticket application having started requests the electronic ticket storage unit 85 to transmit a ticket list corresponding to a list of electronic tickets, and receives the ticket list in step S61.

The ticket application further requests the display unit 58 of the touch panel 31 (display driver 86 controlling the display unit 58) to display a ticket list selection screen through which a ticket of interest is selected from the ticket list in step S62. The display unit 58 displays the ticket list selection screen in response to the request received from the ticket application.

In step S52, the user selects an electronic ticket while viewing the ticket list selection screen displayed on the display unit 58. The ticket application designates the electronic ticket selected by the user as a ticket of interest.

Thereafter, the ticket application requests the display unit 58 to display an authentication standby image in step S63. In step S91, the display unit 58 displays the authentication standby image in response to the request from the ticket application.

In step S64, the ticket application further starts the camera 32 (requests the camera driver 81 to start the camera 32).

The user having confirmed the authentication standby image displayed on the display unit 58 after the start of the camera 32 points the camera 32 to the gate display device 20 in step S53.

The camera 32 pointed to the gate display device 20 starts capturing an image of a superimposition image displayed on the gate display device 20, and supplies a captured image (data indicating captured image) of the superimposition image to the ticket application in step S81.

In step S65, the ticket application extracts encoded information (ID information) from the captured image received from the camera 32 to determine success or failure of the extraction.

The ticket application having succeeded extraction of encoded information from the captured image decodes the encoded information into ID information in step S66.

Then, in step S67, the ticket application requests the electronic ticket storage unit 85 to transmit attribute information about the ticket of interest and the number of times of use of the ticket of interest, and receives the attribute information and the number of times of use.

In step S68, the ticket application increments the number of times of use of the ticket of interest, and determines admittance or non-admittance of entrance on the basis of the incremented number of times of use, the attribute information about the ticket of interest, and the ID information extracted from the captured image.

More specifically, the ticket application performs authentication of the ticket of interest (ticket authentication) on the basis of the ID information and the attribute information about the ticket of interest, and determines whether or not the number of times of use has exceeded an upper limit contained in the attribute information.

In case of success of ticket authentication and non-excess of the upper limit of the number of times of use, admittance of entrance with the ticket of interest is determined as entrance admittance/non-admittance determination.

On the other hand, in case of failure of ticket authentication or excess of the upper limit of the number of times of use, non-admittance of entrance with the ticket of interest is determined as entrance admittance/non-admittance determination.

In subsequent step S69, the ticket application ends capturing an image of the superimposition image by the camera 32.

In step S70, the ticket application further requests the electronic ticket storage unit 85 to transmit an OK image or an NG image (hereinafter also referred to as entrance admittance/non-admittance image) in accordance with a result of entrance admittance/non-admittance determination, and acquires the OK image or the NG image.

Then, in subsequent step S71, the ticket application requests the display unit 58 to display the entrance admittance/non-admittance image. In step S92, the display unit 58 displays the entrance admittance/non-admittance image in response to the request from the ticket application.

In step S54, the user presents the entrance admittance/non-admittance image displayed on the display unit 58 to the gate staff for checking.

In case of the OK image presented as the entrance admittance/non-admittance image, the user passes through the entrance gate 11 in step S55.

Then, in subsequent step S56, the user operates the touch panel 31 to end display of the entrance admittance/non-admittance image.

In step S72, the ticket application ends display of the entrance admittance/non-admittance image on the display unit 58.

Note that the user is stopped by the gate staff in case of the NG image presented as the entrance admittance/non-admittance image.

In addition, according to the example in FIG. 14, display of the entrance admittance/non-admittance image is ended (deleted) in accordance with the operation by the user. However, the entrance admittance/non-admittance image (OK image or NG image) may be deleted after an elapse of a predetermined time from a state unable to extract encoded information after display of the entrance admittance/non-admittance image as described with reference to FIG. 13.

<Mechanism of ID Information Transmission>

Figure 15:
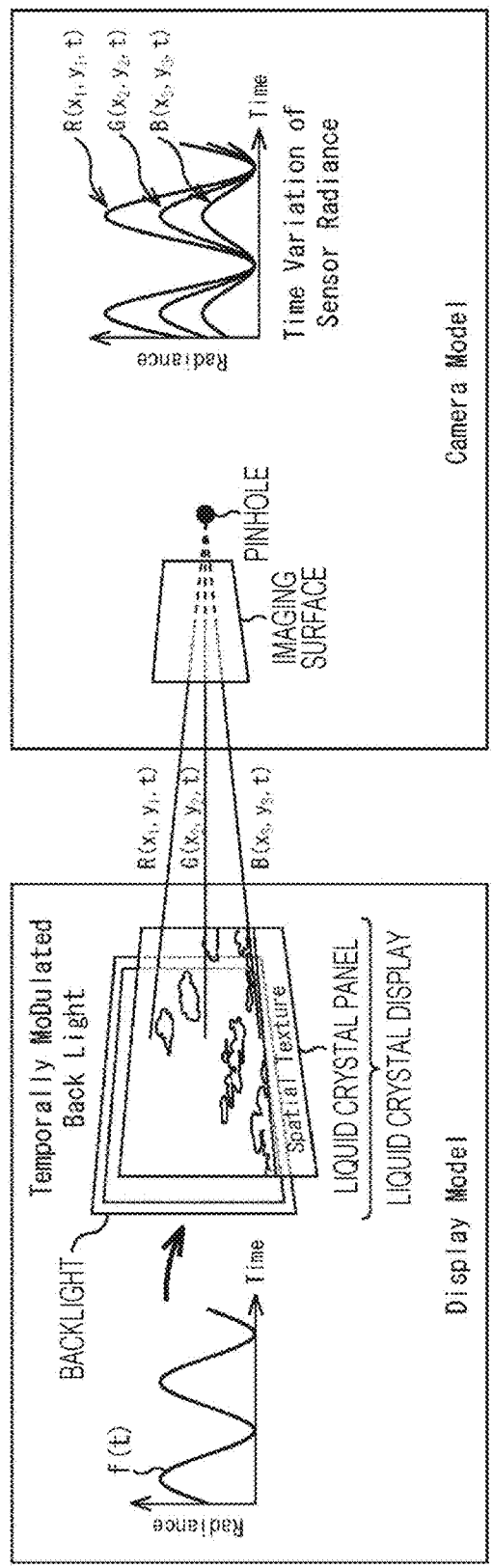
FIG. 15 is a view illustrating a mechanism of information transmission of ID information from the gate display device 20 to the portable terminal 30.

FIG. 15 is a view illustrating a mechanism for transmitting ID information from the gate display device 20 to the portable terminal 30.

As described with reference to FIG. 12, a superimposition image displayed on the gate display device 20 is formed by visible light. In this case, ID information is transmitted to the portable terminal 30 through so-called visible light communication while superimposed on the superimposition image formed by visible light.

The (mechanism of) information transmission by the superimposition image formed by visible light is describable on the basis of a display model and a camera model.

The display model is a model displaying a superimposition image, such as the gate display device 20, while the camera model is a model capturing an image of the superimposition image, such as the portable terminal 30.

The display model includes a display for displaying an image, such as a liquid crystal display. The liquid crystal display includes a liquid crystal panel which determines spatial texture of an image, and a backlight which determines radiance of a (whole) image.

ID information is encoded into sine-wave-based encoded information in the display model. The encoded information is a modulation signal f(t) generated by modulating a phase of a sine wave in accordance with ID information, for example.

Radiance of the backlight is further modulated (controlled) in accordance with the encoded information f(t) constituted by the modulation signal in the display model.

In addition, the liquid crystal panel is driven on the basis of an original image.

According to the liquid crystal display, light emitted from the backlight passes through the liquid crystal panel to display an image.

As described above, radiance of (light emitted from) the backlight is modulated in accordance with the encoded information f(t). In this case, an image displayed on the liquid crystal display becomes a superimposition image containing an original image for driving the liquid crystal panel, and the encoded information f(t) (and ID information) modulating radiance of the backlight and superimposed on the original image as information indicating time radiance variations.

The sine wave constituting the modulation signal f(t) is a high-frequency sine wave with which radiance variations are not perceptible by a sense of vision of a human. Accordingly, the ID information (coded information f(f)) is superimposed on the original image in a manner not perceptible by a sense of vision of a human.

The camera model indicates a state that a pinhole camera captures an image of the superimposition image displayed on the liquid crystal display of the display model.

The image captured by the pinhole camera may be expressed as a cross section of a beam passing through a pinhole at the time of passage through a virtual imaging surface located before the pinhole.

In case of the imaging surface disposed at a position facing the front of the liquid crystal display of the display model, an image formed on the imaging surface becomes an image similar to an image on the display screen of the liquid crystal display.

In the display model, the backlight simultaneously varies radiance of the whole display screen of the liquid crystal display. Accordingly, the image on the imaging surface of the camera model, i.e., radiance of the captured image captured by the pinhole camera similarly varies with time regardless of the position of the captured image. In this case, radiance variations of the captured image are proportional to the encoded information f(t) (and ID information) as indicated as "Time Variation of Sensor Radiance" in FIG. 15.

Here, in FIG. 15, $R(x_1, y_1, t)$ indicates a time (t) variation of radiance at a position $(x_1, y_1)$. Similarly, $G(x_2, y_2, t)$ indicates a time (t) variation of radiance at a position $(x_2, y_2)$, while $B(x_3, y_3, t)$ indicates a time (t) variation of radiance at a position $(x_3, y_3)$. These definitions are applicable to other figures.

Radiance of a superimposition image displayed on the liquid crystal display of the display model varies in accordance with radiance variations of the backlight. In a state that a variation speed of radiance variations of the backlight is set to a speed higher than a time response speed of a human eye, radiance variations of the superimposition image are integrated when viewed by a human, and therefore are not perceptible by a human.

Note that ID information may be superimposed on an original image as color variations in the display model, as well as radiance variations.

For example, in case of a backlight constituted by a light emitting diode (LED) of multicolor type, such as RGB, ID information indicating color variations may be superimposed on an original image by modulating intensity balance of the multicolor LED on the basis of ID information (encoded ID information f(t)).

Even in case of ID information indicating color variations and superimposed on an original image, as well as radiance variations, color variations of the superimposition image are integrated when viewed by a human, and therefore are not perceptible by a human in a state that a color variation speed is set to a speed higher than a time response speed of a human eye.

FIGS. 16A, 16B, 16C, 16D and 16E are views illustrating an example of a method for extracting ID information (encoded ID information) from a captured image by the extraction unit 82 in FIG. 12.

Suppose herein that the camera 32 of the portable terminal 30 is constituted by a camera including a focal-plane shutter (rolling shutter) system image sensor, for example.

A complementary metal oxide semiconductor (CMOS) image sensor is an example of the focal-plane shutter system image sensor.

Figure 16:
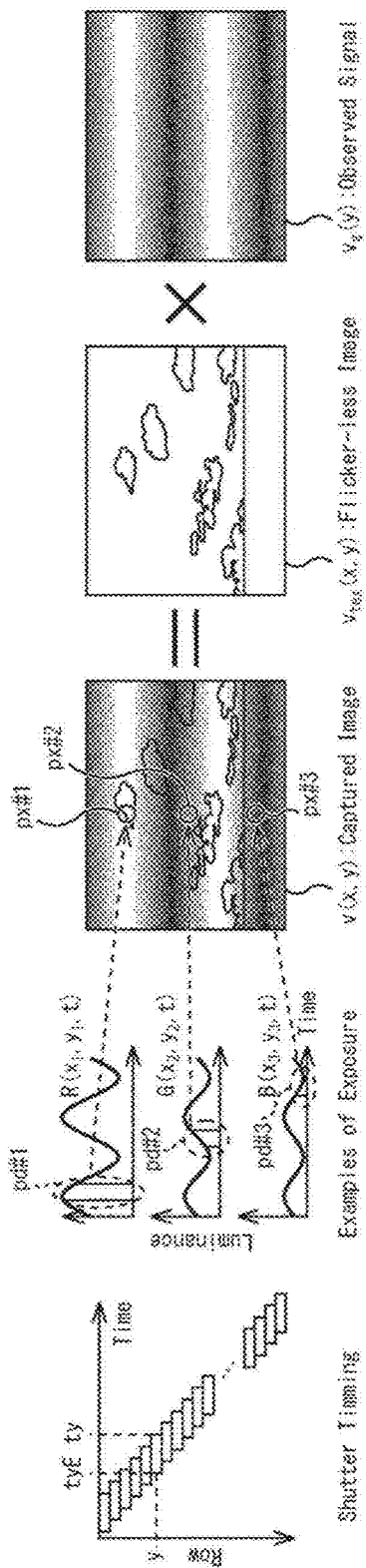
FIGS. 16A, 16B, 16C, 16D and 16E are views illustrating an example of an extraction method performed by an extraction unit 82 to extract ID information (encoded ID information) from a captured image.

FIG. 16A illustrates shutter timing of the camera 32 of the focal-plane shutter system (including image sensor).

In FIG. 16A, the horizontal axis represents time, while the vertical axis represents positions of pixels in the vertical direction.

The focal-plane shutter system camera 32 performs exposure and reading of a pixel value while shifting timing little by little for each line (horizontal line).

Accordingly, timing of an exposure period pd#1 of a pixel px#1 on an upper line (hereinafter also referred to as upper pixel) of a frame of a captured image captured by the camera 32, timing of an exposure period pd#2 of a pixel px#2 on an approximately middle line (hereinafter also referred to as middle pixel) of the frame in the vertical direction, and timing of an exposure period pd#3 of a pixel px#3 on a lower line (hereinafter also referred to as lower pixel) of the frame are different from each other.

The timing of the pixel exposure period delays (is delayed) more with nearness to the lower line of the frame. Note that the respective exposure periods pd#1, pd#2, and pd#3 have a uniform length (time).

FIG. 16B illustrates an example of time variations of pixel values of the upper pixel px#1, middle pixel px#2, and lower pixel px#3 of the camera 32 (image sensor of camera 32).

Note that the upper pixel pd#2, is a pixel at a position $(x_1, y_1)$, and that radiance of the pixel px#1 is expressed as $R(x_1, y_1, t)$. The middle pixel px#2 is a pixel at a position $(x_2, y_2)$, and radiance of the pixel px#2 is expressed as $G(x_2, y_2, t)$. The lower pixel px#3 is a pixel at a position $(x_3, y_3)$, and radiance of the pixel px#3 is expressed as $B(x_3, y_3, t)$.

Radiance of a superimposition image to be captured by the camera 32 varies uniformly in a plane on the basis of ID information (more precisely, encoded ID information) f(t) superimposed on the superimposition image. In this case, a quantity of incident light entering the position $(x_1, y_1)$ of the upper pixel px#1, the position $(x_2, y_2)$ of the middle pixel px#2, and the position $(x_3, y_3)$ of the lower pixel px#3, of the camera 32 vary in a synchronous manner.

According to the focal-plane shutter system camera 32, however, there are produced deviations of (timing of) the exposure period pd#1 of the upper pixel px#1, the exposure period pd#2 of the middle pixel px#2, and the exposure period pd#3 of the lower pixel px#3 from each other as illustrated in FIG. 16B.

In this case, radiance of the superimposition image to be captured by the camera 32 varies with time uniformly in a plane on the basis of the ID information f(t) superimposed on the superimposition image, while radiance of a captured image captured by the camera 32 from the superimposition image varies with positions in the vertical direction.

FIG. 16C illustrates an example of a captured image v(x, y) captured from a superimposition image whose radiance varies with time uniformly in a plane by using the focal-plane shutter system camera 32 on the basis of the ID information f(t).

As described above, radiance of the captured image v(x, y) varies for each position in the vertical direction. More specifically, time radiance variations corresponding to the ID information f(t) and superimposed on the superimposition image appear on the captured image v(x, y) as a radiance pattern $v_g(y)$ constituted by horizontal bands and exhibiting spatial radiance variations.

The foregoing radiance pattern $v_g(y)$ appearing as horizontal bands on the captured image v(x, y) captured by the focal-plane shutter system camera 32 is called flicker.

Flicker occurs as a result of adoption of the focal-plane shutter system. Accordingly, the time radiance variations on the superimposition image constantly appear as horizontal bands on the captured image v(x, y) regardless of the relative positional relationship between the gate display device 20 displaying the superimposition image and the portable terminal 30 capturing an image of the superimposition image.

More specifically, the captured image v(x, y) captured by the focal-plane shutter system camera 32 from the superimposition image on which the ID information f(t) indicating time radiance variations is superimposed is an image constituted by a flicker-free original image $v_{tex}(x, y)$, and the radiance pattern $v_g(y)$ which forms horizontal bands exhibiting spatial radiance variations in correspondence with the ID information f(t) and is superimposed on the original image $v_{tex}(x, y)$.

FIG. 16D illustrates an example of the original image vtex(x, y) constituting the captured image v(x, y) in FIG. 16C, while FIG. 16E illustrates the radiance pattern vg(y) as horizontal bands constituting the captured image v(x, y) in FIG. 16C.

As described above, the ID information f(t) superimposed on the superimposition image as time radiance variations appears as spatial radiance variations on the captured image in a case where an image of the superimposition image is captured by the focal-plane shutter system camera 32. Accordingly, the portable terminal 30 is allowed to extract the ID information (encoded ID information) f(t) on the basis of the spatial radiance variations of the ID information f(t).

Figure 17:
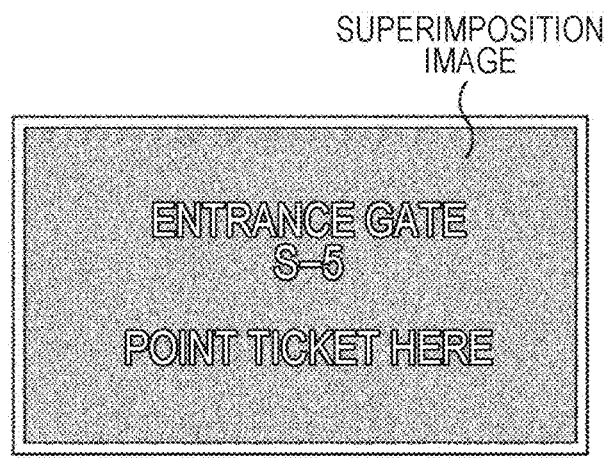
FIG. 17 is a view illustrating an example of a superimposition image displayed on the gate display device 20.

FIG. 17 is a view illustrating an example of a superimposition image displayed on the gate display device 20.

The superimposition image contains ID information (encoded ID information) superimposed on an original image which displays a predetermined text on a background image in one color without pattern for notifying the user about information concerning the entrance gate 11 in a comprehensible manner as shown in FIG. 17.

The predetermined text in FIG. 17 displays a character string "ENTRANCE GATE S-5" for identifying the entrance gate 11, and a message "POINT TICKET HERE" for urging the user to point the camera 32 of the portable terminal 30 toward the gate display device 20.

Figure 18:
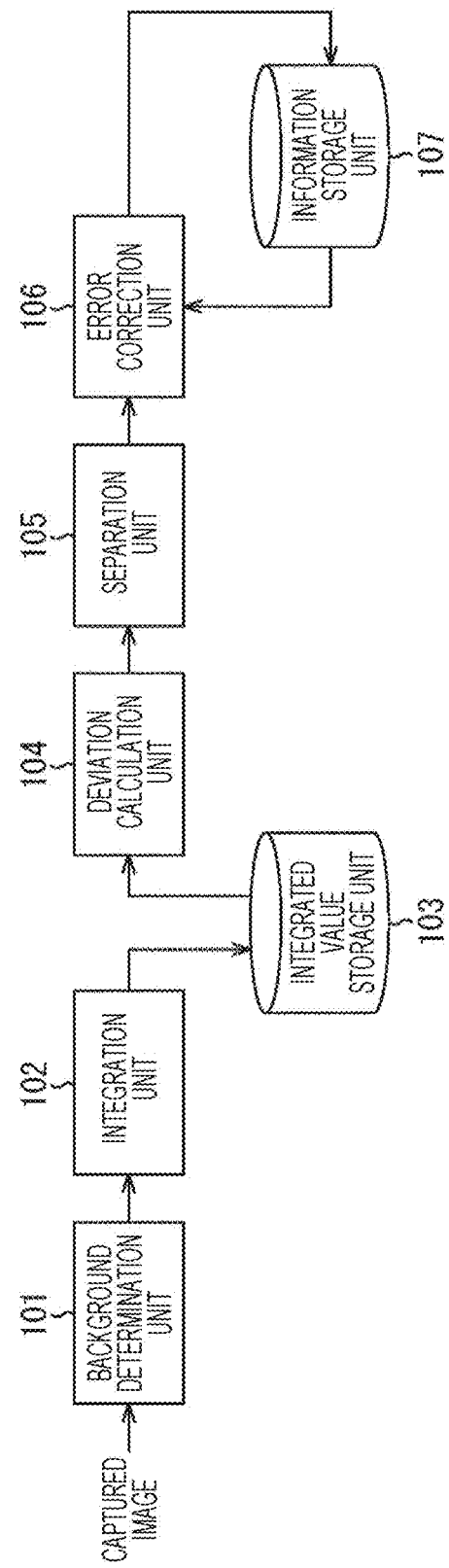
FIG. 18 is a block diagram showing a configuration example of the extraction unit 82.

FIG. 18 is a block diagram showing a configuration example of the extraction unit 82 in FIG. 12.

Note that it is assumed herein that ID information f(t) (encoded ID information) is extracted from a captured image of the superimposition image containing the ID information superimposed on the original image which displays the predetermined text on the background image in one color without pattern as shown in FIG. 17, for example, for simplifying the description.

It is further assumed that the color of the background image (background color) of the original image constituting the captured image (superimposition image) is known.

The extraction unit 82 in FIG. 18 includes a background determination unit 101, an integration unit 102, an integrated value storage unit 103, a deviation calculation unit 104, a separation unit 105, an error correction unit 106, and an information storage unit 107.

The background determination unit 101 receives a captured image of the superimposition image containing ID information superimposed on the original image which displays the predetermined text on a background image in one color without pattern as shown in FIG. 17. The captured image is supplied from the camera driver 81 (FIG. 12) to the background determination unit 101 in units of frame.

The background determination unit 101 determines whether or not each pixel of the captured image received from the camera driver 81 is a pixel of the background image (pixel in the color of the background image) (hereinafter also referred to as background pixel), and supplies the captured image to the integration unit 102 together with pixel information indicating the determination result.

The integration unit 102 integrates, for each line, pixel values of only background pixels contained in pixels of the captured image received from the background determination unit 101 on the basis of pixel information also received from the background determination unit 101. Thereafter, the integration unit 102 supplies integrated values of the pixel values of the background pixels for each line to the integrated value storage unit 103 as line integrated values.

The integrated value storage unit 103 stores line integrated values supplied from the integration unit 102 in units of one frame.

The deviation calculation unit 104 calculates, as an integrated average value, an average of all the line integrated values of the captured image for one frame stored in the integrated value storage unit 103. The deviation calculation unit 104 further calculates deviations from an average of the line integrated values of the captured image for one frame stored in the integrated value storage unit 103, i.e., logarithmic deviations (ratios), for example, and supplies the calculated deviations to the separation unit 105.

The separation unit 105 performs deconvolution for deviations of the line integrated values received from the deviation calculation unit 104 by using a shutter function which expresses characteristics of the shutter of the focal-plane shutter system camera 32 having captured an image of the captured image to separate the ID information f(t) superimposed on the captured image.

It is assumed herein that the shutter function, the deviation of the line integrated value of the yth line (yth horizontal line from above), the color of the background image as one color without pattern, and the ID information (encoded ID information) are expressed as s(t), u(y), $u_{bg}$, and f(t), respectively, the deviation u(y) of the line integrated value is expressed as Equation (1).

$$u(y)=(s(t)*f(t))u_{bg} \quad (1)$$

Note that * indicates convolution.

It is assumed herein that a square matrix which has y-row t-column components corresponding to function values of the shutter function s(t) at a time t in the yth line is expressed as S. It is further assumed that a column vector which has t-row components corresponding to the ID information f(t) at the time t is expressed as F, and that a column vector which has y-row components corresponding to the deviations u(y) of the line integrated value in the yth line is expressed as U.

In this case, Equation (1) is expressed as Equation (2) by using the square matrix S, and the column vectors F and U.

$$U=SFu_{bg} \quad (2)$$

When a pseudo inverse matrix of the square matrix S is expressed as S^, the ID information (F) in Equation (2) is calculated on the basis of Equation (3) which performs deconvolution for the deviation (U) of the line integrated value by using the shutter function (S).

$$F=(1/u_{bg})S\hat{}U \quad (3)$$

The separation unit 105 calculates the ID information f(t) (column vector F having components of ID information f(t)) on the basis of Equation (3).

The separation unit 105 supplies the ID information (f(t)) calculated on the basis of Equation (3) to the error correction unit 106.

The error correction unit 106 supplies the ID information received from the separation unit 105 to the information storage unit 107 to store the ID information therein while the camera 32 is capturing an image of the superimposition image.

The error correction unit 106 further obtains correct (estimated as correct) ID information (encoded ID information) selected from targets of a plurality of items of ID information stored in the information storage unit 107 on the basis of majority decision, and supplies the obtained ID information to the decoding unit 83 (FIG. 12).

The background determination unit 101 of the extraction unit 82 thus configured determines whether or not each of pixels contained in the captured image of one frame received from the camera driver 81 is a background pixel, and supplies the captured image to the integration unit 102 together with pixel information indicating the result of determination.

The integration unit 102 calculates, for each line, line integrated values by integrating pixel values of only background pixels in the pixels of the captured image received from the background determination unit 101 on the basis of the pixel information received from the background determination unit 101. Thereafter, the integration unit 102 supplies the obtained line integrated values to the integrated value storage unit 103 and stores the line integrated values therein.

After the integrated value storage unit 103 stores line integrated values, the deviation calculation unit 104 obtains deviations of the line integrated values stored in the integrated value storage unit 103 for one frame of the captured image, and supplies the obtained deviations to the separation unit 105.

The separation unit 105 performs deconvolution for deviation u(t) of line integrated value received from the deviation calculation unit 104 on the basis of Equation (3) by using the shutter function s(t) expressing characteristics of the shutter of the camera 32 to separate ID information f(t) superimposed on the captured image, and supplies the ID information f(t) to the error correction unit 106.

The error correction unit 106 supplies the ID information received from the separation unit 105 to the information storage unit 107, and stores the ID information therein.

In the background determination unit 101 through the error correction unit 106, similar processes are repeated for captured images of a plurality of frames captured in a predetermined period by the camera 32, for example. As a result, a plurality of items of ID information are stored in the information storage unit 107.

The error correction unit 106 performs majority decision for a plurality of items of ID information stored in the information storage unit 107. In case of presence of a predetermined number or more of items of the majority ID information having collected the largest number of votes, the majority ID information (majority encoded ID information) is supplied to the decoding unit 83 (FIG. 12) on the assumption that extraction of ID from the captured image has succeeded.

Figure 19B:
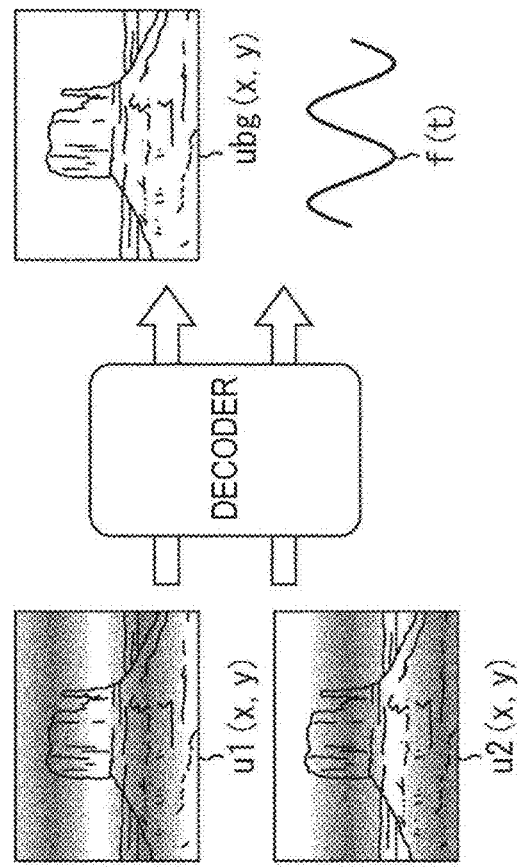
FIGS. 19A and 19B are views illustrating an extraction method for extracting ID information from a captured image. The ID information is information superimposed on an original image containing any background image.
Figure 19A:
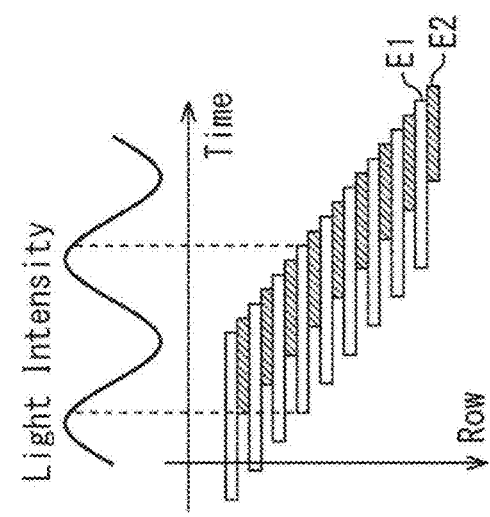

FIGS. 19A and 19B are views illustrating a method for extracting ID information superimposed on an original image containing any image as a background image from a captured image.

According to the example described above, the original image contains a predetermined text which expresses information or the like about the entrance gate 11 on the background image in one color without pattern as described with reference to FIG. 17. However, adoption of a background image other than the background image in one color without pattern may be demanded as an original image.

More specifically, adoption of any image as a background image of an original image may be desired in a certain event in view of user interface, design, advertisement, or others, for example.

An example of a focal-plane shutter system CMOS image sensor is a CMOS image sensor which has a mechanism for varying an exposure period (length of exposure period) for capturing an image for each line or for each pixel. Even in case of use of this type of CMOS image sensor as the camera 32 to designate any image as a background of an original image, ID information (encoded ID information) is extractable from a captured image.

FIG. 19A illustrates an example of shutter timing of the focal-plane shutter type camera 32 (including CMOS image sensor) which has a mechanism for varying an exposure period for capturing an image for each line or pixel.

In FIG. 19A, the horizontal axis represents time, while the vertical axis represents positions of pixels in the vertical direction.

In FIG. 19A, different two exposure periods, i.e., a first exposure period E1 and a second exposure period E2, are shown as exposure periods of the camera 32 for each line. The first exposure period E1 is longer than the second exposure period E2.

In addition, the line of the first exposure period E1 and the line of the second exposure period E2 of the camera 32 are disposed close to each other. In FIG. 19A, the lines of the first exposure period E1 and the lines of the second exposure period E2 are alternately disposed.

The exposure length of the first exposure period E1 is different from the exposure length of the second exposure period E2. In this case, time integration of time variations of the ID information (encoded ID information) f(t) superimposed on the superimposition image in case of image capturing of the superimposition image by the camera 32 in the first exposure period E1 is performed in a manner different from the manner of the corresponding time integration in the second exposure period E2.

As a result, the horizontal band radiance pattern of spatial radiance variations corresponding to the ID information f(t) and appearing on an image $u_1(x, y)$ constituted by a collection of lines in the first exposure period E1 is different from the corresponding horizontal band radiation pattern appearing on an image $u_2(x, y)$ constituted by a collection of lines in the second exposure period E2.

FIG. 19B is a view illustrating separation of the original image ubg(x, y) corresponding to any image, and the ID information f(t) superimposed on the original image ubg(x, y) from the images u1(x, y) and u2(x, y).

It is assumed herein that the line integrated value of the yth line in the integrated values of the pixel values of the image $u_1(x, y)$ for the respective lines is expressed as $u_1(y)$, and that the line integrated value of the yth line in the integrated values of the pixel values of the image $u_2(x, y)$ for the respective lines is expressed as $u_2(y)$. It is further assumed that the line integrated value of the yth line in the integrated values of the pixel values of the original image $u_{bg}(x, y)$ for the respective lines is expressed as $u_{bg}(y)$. It is further assumed that the shutter function for the lines of the first exposure period E1 is expressed as $s_1(t)$, and that the shutter function for the lines of the second exposure period E2 is expressed as $s_2(t)$.

In this case, the line integrated values $u_1(y)$ and $u_2(y)$ are expressed by Equation (4) and Equation (5).

$$u_1(y)=(s_1(t)*f(t))u_{bg}(y) \qquad (4)$$

$$u_2(y)=(s_2(t)*f(t))u_{bg}(y) \qquad (5)$$

Suppose that the first exposure period E1 is an integral multiple of a cycle of radiance variations of the ID information f(t), for example. In this case, radiance variations of the ID information f(t) are canceled by integration in the first exposure period E1 for the line integrated value $u_1(y)$ of the image $u_1(x, y)$ captured in the first exposure period E1. Accordingly, the line integrated value $u_1(y)$ in Equation (4) is expressed as Equation (6) by use of a constant k.

$$u_1(y)=k \cdot u_{bg}(y) \quad (6)$$

The line integrated value $u_2(y)$ is expressed as Equation (7) by substituting Equation (6) for Equation (5).

$$u_2(y)=(s_2(t)*f(t))u_1(y)/k \quad (7)$$

Equation (7) is identical to Equation (1) except for the presence of the unknown constant (scaling coefficient) k, wherefore the ID information f(t) is obtainable as described with reference to FIG. 18.

Accordingly, even in case of use of any image other than an image in one color without pattern as (a background image of) an original image, the ID information (encoded ID information) f(t) is extractable from a captured image on the basis of Equation (7) by setting the first exposure period E1 to an integral multiple of the cycle of radiance variations of the ID information f(t).

As described above, the extraction unit 82 integrates, for each line, pixel values of pixels contained in a captured image captured from a superimposition image in the first exposure period E1 of the exposure periods different for each line to calculate the line integrated value $u_1(y)$, and integrates, for each line, pixel values of pixels captured in the second exposure period E2 to calculate the line integrated value $u_2(y)$. The extraction unit 82 is therefore capable of separating the ID information f(t) superimposed on the captured image by utilizing a relationship that the line integrated value $u_2(y)$ is proportional to the product of convolution of the ID information f(t) and the shutter function $s_2(t)$ indicating the second exposure period E2, and the line integrated value $u_1(y)$ as shown in Equation (7).

<Another Example of Procedures for Ticket Authentication>

Figure 20:
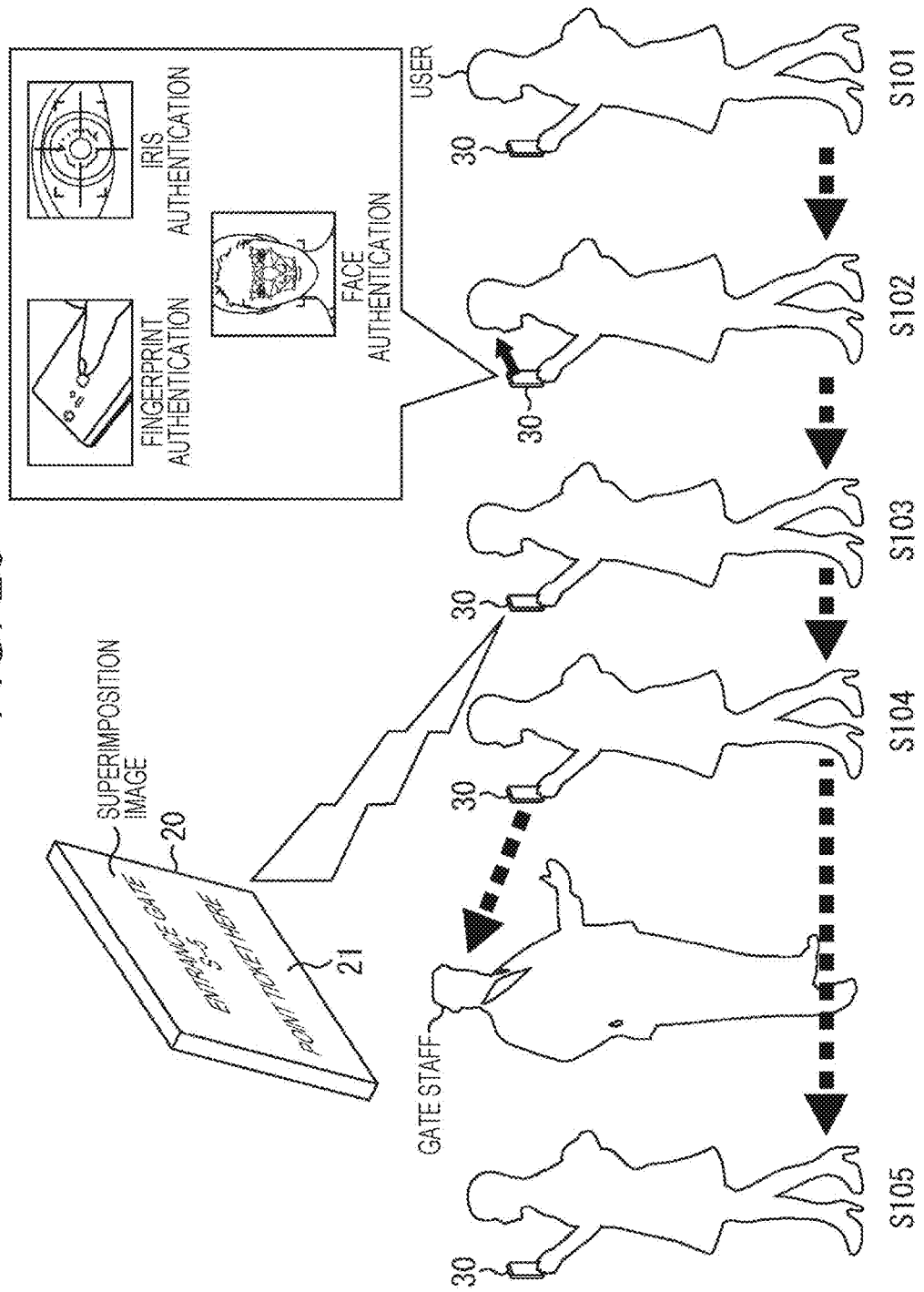
FIG. 20 is a view illustrating another example of procedures for ticket authentication performed by the entrance gate system.

FIG. 20 is a view illustrating another example of procedures for ticket authentication performed by the entrance gate system in FIG. 6.

While only ticket authentication of a ticket of interest is performed for authentication in the example in FIG. 8, user authentication based on biometric authentication (user authentication) is performed in the example in FIG. 20 in addition to ticket authentication of a ticket of interest.

It is assumed herein that the portable terminal 30 in FIG. 20 includes a biosensor 121 (FIG. 21) described below to obtain (sense) biotic information about the user.

Similarly to the example illustrated in FIG. 8, the user stands in the line of the lane, and starts the ticket application of the portable terminal 30 when coming close to the entrance gate 11.

The ticket application of the portable terminal 30 retaining a list of electronic tickets displays the list on the touch panel 31 of the portable terminal 30. The user selects a ticket of interest from the list of tickets displayed on the touch panel 31.

After the ticket of interest is selected, the ticket application starts the biosensor 121 (described below) which acquires biotic information about the user (performs sensing) in step S101.

In step S102, the user allows the biosensor 121 to acquire biotic information about the user while walking toward the entrance gate 11.

The biotic information adopted herein includes an image of the whole face, an image of an eye part of the face, and a fingerprint, for example, as illustrated in FIG. 20.

In case of adoption of an image of the whole face as biotic information, face authentication using the image of the whole face may be performed as biometric authentication. On the other hand, in case of adoption of an image of an eye part of the face as biotic information, iris authentication using the image of the eye part may be performed as biometric authentication. Alternatively, in case of adoption of a fingerprint as biotic information, fingerprint authentication using the fingerprint may be performed as biometric authentication.

The ticket application checks the presence or absence of biotic information associated with the ticket of interest (hereinafter also referred to as registered biotic information). In case of absence of registered biotic information, the application associates biotic information obtained by the biosensor 121 (hereinafter also referred to as acquired biotic information) with the ticket of interest as registered biotic information.

More specifically, the ticket application associates acquired biotic information with the ticket of interest as registered biotic information to recognize the user associated with the biotic information acquired by the biosensor 121 as a proper user of the ticket of interest.

Thereafter, the ticket application displays an authentication standby image on the touch panel 31.

On the other hand, in case of presence of registered biotic information associated with the ticket of interest, the ticket application compares the acquired biotic information with the registered biotic information to perform biometric authentication as user authentication for checking whether or not the user is a proper user of the ticket of interest.

In case of failure of biometric authentication and user authentication due to disagreement between the acquired biotic information and the registered biotic information, the ticket application displays an NG image on the touch panel 31.

On the other hand, in case of success of biometric authentication and user authentication based on agreement between the acquired biotic information and the registered biotic information, the ticket application displays the authentication standby image on the touch panel 31.

After the authentication standby screen is displayed on the touch panel 31, the ticket application starts the camera 32.

After the start of the camera 32, the user further walks toward the entrance gate 11 while pointing the camera 32 toward the gate display device 20 provided on the entrance gate 11 of the line of the user.

Thereafter, in steps S103, S104, and S105, procedures similar to the procedures in steps S2, S3, and S4 in FIG. 8 are performed for ticket authentication of the ticket of interest.

Note that, while user authentication based on biometric authentication, and ticket authentication of the ticket of interest are performed in this order in the example in FIG. 20, it is only required to complete user authentication and ticket authentication of the ticket of interest before the user passes through the entrance gate 11. In other words, user authentication and ticket authentication may be performed in parallel, or in the order of ticket authentication and user authentication.

In addition, while the acquired biotic information is associated with the ticket of interest as registered biotic information at the time of initial use of the ticket of interest after purchase of the interest in the above example, the registered biotic information may be associated with the ticket of interest prior to (initial) use of the ticket of interest.

More specifically, the user may acquire biotic information through the portable terminal 30 and associate the acquired biotic information (acquired biotic information) with the ticket of interest as registered biotic information at any timing prior to use of the ticket of interest, such as a time immediately after purchase of the ticket of interest, for example.

<Functional Configuration Example of Gate Display Device 20 and Portable Terminal 30>

FIG. 21 is a block diagram showing a functional configuration example of the gate display device 20 and the portable terminal 30 for performing user authentication and ticket authentication.

Note that parts identical to the corresponding parts in FIG. 12 are given identical reference numbers, and description of these parts are omitted where appropriate.

The gate display device 20 in FIG. 21 is configured similarly to the gate display device 20 in FIG. 12.

On the other hand, the portable terminal 30 in FIG. 21 is different from the portable terminal 30 in FIG. 12 in that the biosensor 121, a biosensor driver 122, and a biometric authentication unit 123 are added.

In the components of the biosensor 121 through the biometric authentication unit 123, the biosensor driver 122 and the biometric authentication unit 123 are (virtually) realized by the ticket application, while the biosensor 121 is provided on the portable terminal 30 as hardware.

The biosensor 121 acquires biotic information about the user by sensing, and supplies the acquired biotic information to the biosensor driver 122.

Biotic information herein may be an image of a face. In case of face authentication or iris authentication performed by using the face image as biometric authentication, the biosensor 121 may be constituted by the camera 33 (FIG. 11), for example, provided on the rear of the camera 32 capturing an image of a superimposition image.

In this case, the user at the entrance gate 11 may capture an image of the face by using the camera 33 on the rear of the portable terminal 30 while capturing an image of a superimposition image displayed on the gate display device 20 by using the camera 32 on the front face of the portable terminal 30.

In case of adoption of a fingerprint as biotic information for fingerprint authentication by using the fingerprint as biometric authentication, the biosensor 121 may be a fingerprint sensor sensing a fingerprint. In this case, the portable terminal 30 is required to include a fingerprint sensor as the biosensor 121.

The biosensor driver 122 controls the biosensor 121.

More specifically, the biosensor driver 122 starts the biosensor 121 under control by the controller 87 in response to a start of the ticket application, and allows the biosensor 121 to acquire biotic information about the user. Thereafter, the sensor driver 122 supplies the biotic information acquired by the biosensor 121 to the biometric authentication unit 123 as acquired biotic information.

The biometric authentication unit 123 having received the acquired biotic information from the biosensor driver 122 reads registered biotic information associated with the ticket of interest stored in the electronic ticket storage unit 85, and performs biometric authentication for determining whether or not the acquired biotic information agrees with registered biotic information.

In case of disagreement between acquired biotic information and registered biotic information, the biometric authentication unit 123 supplies, to the controller 87, a result of authentication that user authentication by biometric authentication has failed.

On the other hand, in case of agreement between acquired biotic information and registered biotic information, the biometric authentication unit 123 supplies, to the controller 87, a result of authentication that user authentication by biometric authentication has succeeded.

The controller 87 having received the result of authentication indicating success of user authentication from the biometric authentication unit 123 recognizes the user as a proper user of the ticket of interest, and allows the display driver 86 to display an authentication standby image on the touch panel 31.

On the other hand, the controller 87 having received the result of authentication indicating failure of user authentication from the biometric authentication unit 123 determines the user as an improper user of the ticket of interest, and determines non-admittance of entrance with the ticket of interest as entrance admittance/non-admittance determination.

The controller 87 having determined non-admittance of entrance with the ticket of interest as entrance admittance/non-admittance determination allows the display driver 86 to display the NG image on the touch panel 31.

Note that the biometric authentication unit 123 having received acquired biotic information from the biosensor driver 122 registers the acquired biotic information in the electronic ticket storage unit 85 as registered biotic information in association with the ticket of interest, in case of no registration (storage) of registered authentication information in association with the ticket of interest in the electronic ticket storage unit 85.

<Processes by Gate Display Device 20 and Portable Terminal 30>

Figure 22:
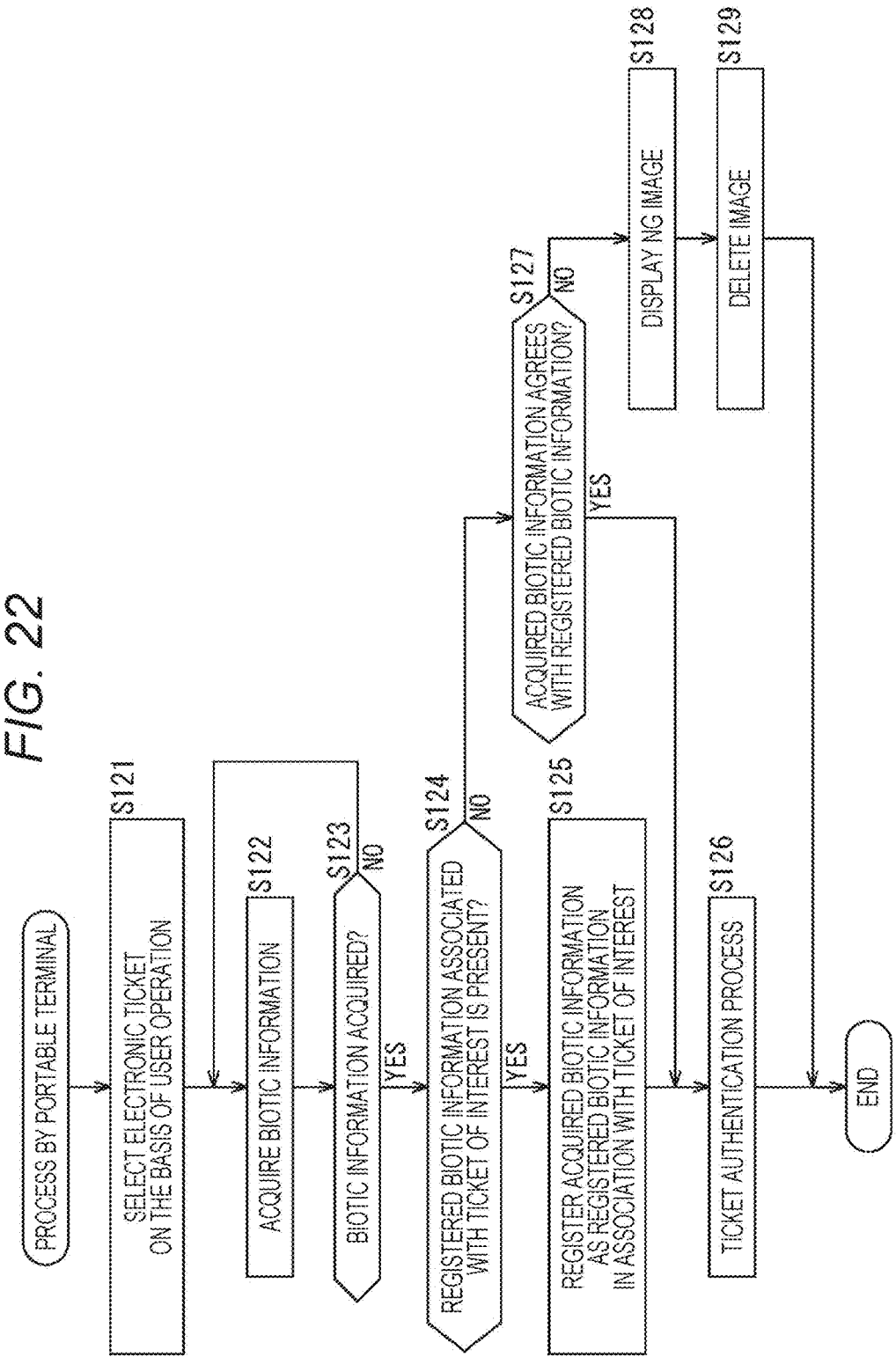
FIG. 22 is a flowchart showing an example of processes performed by the gate display device 20 and the portable terminal 30.

FIG. 22 is a flowchart showing an example of processes performed by the gate display device 20 and the portable terminal 30 in FIG. 21.

Note that the processes performed by the gate display device 20 in FIG. 21 are similar to the corresponding processes in FIG. 13. Accordingly, depiction and description of the processes by the gate display device 20 in FIG. 21 are omitted.

The user carries the portable terminal 30 which contains electronic tickets purchased from a site or the like and stored in the electronic ticket storage unit 85. Then, the user carrying the portable terminal 30 views a superimposition image displayed on the gate display device 20 (display unit 21 of gate display device 20), stands in a line of the lane of the appropriate entrance gate 11, and walks toward the entrance gate 11.

When coming close to the entrance gate 11, the user operates the touch panel 31 of the portable terminal 30 to start the ticket application.

In response to a start of the ticket application, the controller 87 allows the display driver 86 to display a list of electronic tickets stored in the electronic ticket storage unit 85 (ticket list selection screen) on the touch panel 31.

Thereafter, the user operates the touch panel 31 to select an electronic ticket necessary for entrance through the entrance gate 11 from the list of electronic tickets displayed on the touch panel 31. In step S121, the controller 87 designates the electronic ticket selected by the user as a ticket of interest.

The process further proceeds from step S121 to step S122. Thereafter, user authentication is performed on the basis of biometric authentication to check whether or not the user using the ticket of interest is a proper user.

More specifically, the controller 87 allows the biosensor driver 122 to acquire biotic information about the user carrying the portable terminal 30 through the biosensor 121 in step S122.

The biosensor 121 acquires biotic information about the user, such as an image of the face and a fingerprint of the user, under control by the biosensor driver 122, and supplies the biotic information as acquired biotic information to the biosensor driver 122. The biosensor driver 122 supplies the acquired biotic information received from the biosensor 121 to the biometric authentication unit 123.

Thereafter, the process proceeds from step S122 to step S123. The biometric authentication unit 123 determines whether or not the biosensor 121 has acquired biotic information, i.e., whether or not the biosensor driver 122 has supplied acquired biotic information.

In case of determination that acquired biotic information has not been supplied in step S123, the process returns to step S122, where similar processes are repeated.

On the other hand, in case of determination that acquired biotic information has been supplied in step S123, the process proceeds to step S124. The biometric authentication unit 123 determines whether or not registered biotic information associated with the ticket of interest has been already registered in the electronic ticket storage unit 85.

In case of determination that registered biotic information has not been registered in step S124, the process proceeds to step S125. The biometric authentication unit 123 registers the acquired biotic information in the electronic ticket storage unit 85 in association with the ticket of interest. Thereafter, the process proceeds to step S126.

In step S126, a ticket authentication process for ticket authentication of the ticket of interest similar to the corresponding process in steps S32 through S41 in FIG. 13 is performed.

On the other hand, in case of determination that registered biotic information has been already registered in step S124, the process proceeds to step S127. In this step, the biometric authentication unit 123 reads registered biotic information associated with the ticket of interest and registered in the electronic ticket storage unit 85, and performs biometric authentication for determining whether or not the acquired biotic information agrees with the registered biotic information for user authentication.

In other words, the biometric authentication unit 123 determines whether or not the acquired biotic information agrees with the registered biotic information in step S127.

In case of determination that the acquired biotic information agrees with the registered biotic information in step S127, the biometric authentication unit 123 supplies, to the controller 87, a result of authentication that user authentication based on biometric authentication has succeeded.

The controller 87 having received the result of authentication that user authentication has succeeded from the biometric authentication unit 123 recognizes that the user is a proper user of the ticket of interest. In this case, the process proceeds from step S127 to step S126, where a ticket authentication process for ticket authentication of the ticket of interest is performed in a manner similar to the corresponding process in steps S32 through S41 in FIG. 13.

On the other hand, in case of determination that the acquired biotic information does not agree with the registered biotic information in step S127, the biometric authentication unit 123 supplies, to the controller 87, a result of authentication that user authentication based on biometric authentication has failed.

The controller 87 having received a result of authentication that user authentication has failed from the biometric authentication unit 123 determines that the user is not a proper user of the ticket of interest, and determines non-admittance of entrance with the ticket of interest as entrance admittance/non-admittance determination.

In case of determination of non-admittance of entrance with the ticket of interest by the controller 87 as entrance admittance/non-admittance determination, the process proceeds from step S127 to step S128.

In step S128, the controller 87 allows the display driver 86 to display, on the touch panel 31, an NG image contained in the ticket image of the ticket of interest stored in the electronic ticket storage unit 85.

The gate staff having confirmed the NG image displayed on the portable terminal 30 (touch panel 31 of portable terminal 30) carried by the user temporarily stops the user, and guides the user in an appropriate manner.

Thereafter, the process proceeds from step S128 to step S129. In this step, the controller 87 allows the display driver 86 to delete the NG image displayed on the touch panel 31.

Note that while user authentication based on biometric authentication and ticket authentication are performed in this order in the example in FIG. 22 similarly to the example in FIG. 20, user authentication and ticket authentication may be performed in parallel, or in the order of ticket authentication and user authentication.

<Behaviors of User and Processes by Portable Terminal 30>

Figure 23:
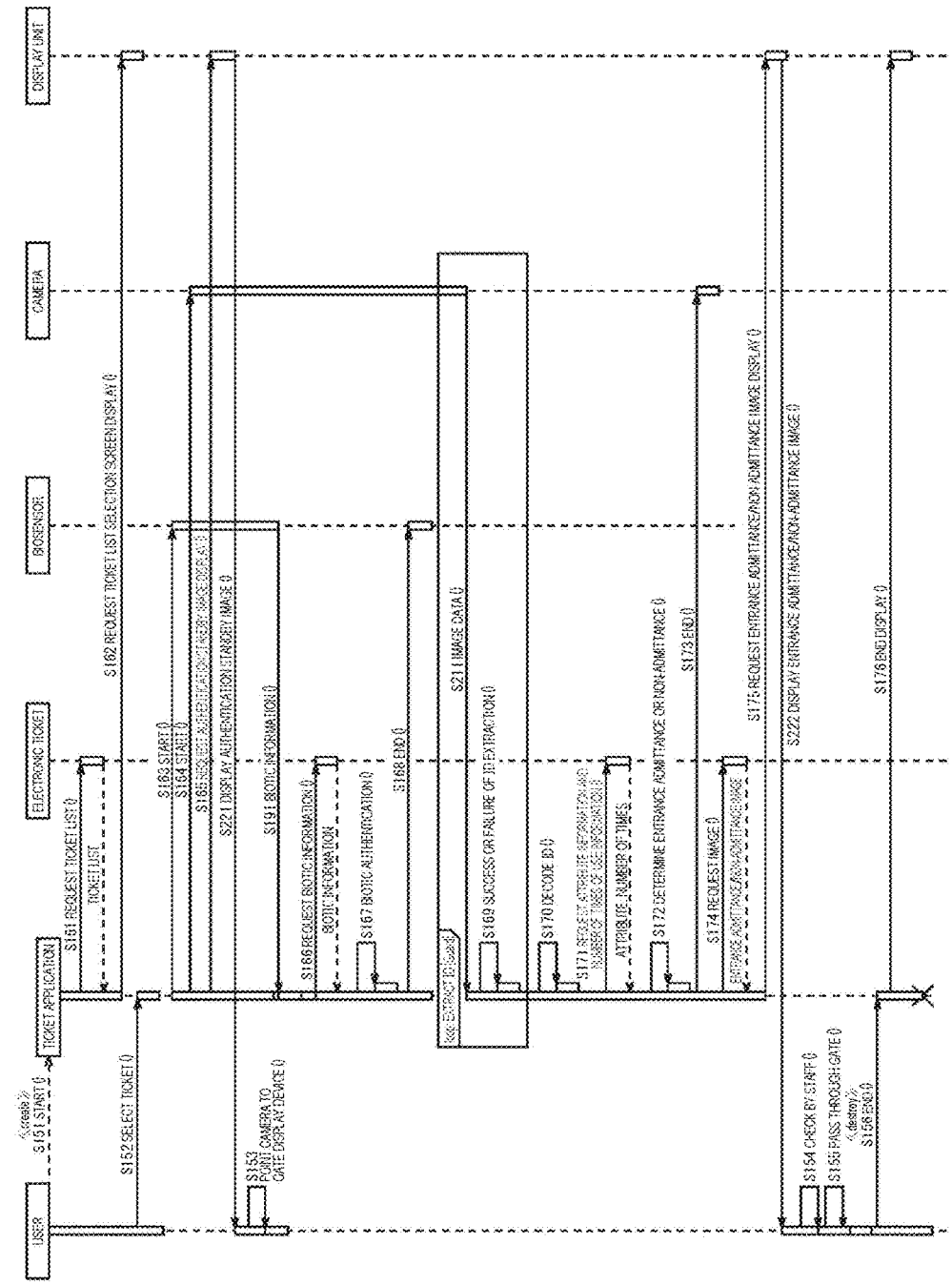
FIG. 23 is a sequence diagram showing an example of behaviors of the user and processes performed by the portable terminal 30 in case of execution of both user authentication and ticket authentication.

FIG. 23 is a sequence diagram showing an example of behaviors of the user and processes performed by the portable terminal 30 in case of execution of both user authentication and ticket authentication.

In step S151, the user starts the ticket application.

In step S161, the ticket application having started requests the electronic ticket storage unit 85 to transmit a ticket list as a list of electronic tickets, and receives the ticket list.

In step S162, the ticket application further requests the display unit 58 (display driver 86 controlling of display unit 58) of the touch panel 31 to display a ticket list selection screen through which a ticket of interest is selected from the ticket list. The display unit 58 displays the ticket list selection screen in response to the request received from the ticket application.

In step S152, the user selects an electronic ticket while viewing the ticket list selection screen displayed on the display unit 58. The ticket application designates the electronic ticket selected by the user as a ticket of interest.

In step S163, the ticket application further starts biosensor 121 (requests the biosensor driver 122 to start the biosensor 121).

In step S164, the ticket application further starts the camera 32 (requests the camera driver 81 to start the camera 32).

Then, in subsequent step S165, the ticket application requests the display unit 58 to display an authentication standby image. In step S221, the display unit 58 displays the authentication standby image in response to the request from the ticket application.

After the start of the camera 32, the user having confirmed the authentication standby image displayed on the display unit 58 points the camera 32 to the gate display device 20 in step S153.

In addition, the biosensor 121 started by the ticket application acquires biotic information about the user, and supplies the biotic information to the ticket application as acquired biotic information in step S191.

The ticket application receives the acquired biotic information from the biosensor 121. In step S166, the ticket application requests the electronic ticket storage unit 85 to transmit registered biotic information associated with the ticket of interest, and acquires the registered biotic information.

In step S167, the ticket application further performs biometric authentication on the basis of the acquired biotic information and the registered biotic information to determine agreement therebetween for user authentication.

Note that, in case of absence of registered biotic information associated with the ticket of interest, the ticket application registers the acquired biotic information in the electronic ticket storage unit 85 as registered biotic information in association with the ticket of interest in step S167.

Thereafter, the ticket application ends acquisition of biotic information by the biosensor 121 in step S168.

On the other hand, the camera 32 pointed to the gate display device 20 starts capturing an image of a superimposition image displayed on the gate display device 20, and supplies a captured image (image data indicating captured image) of the superimposition image to the ticket application in step S211.

In step S169, the ticket application extracts encoded information (ID information) from the captured image received from the camera 32, and determines success or failure of extraction.

The ticket application having succeeded extraction of encoded information from the captured image decodes the encoded information into ID information in step S170.

Then, in subsequent step S171, the ticket application requests the electronic ticket storage unit 85 to transmit attribute information and the number of times of use of the ticket of interest, and receives the information and the number of times.

In step S172, the ticket application increments the number of times of use of the ticket of interest. The ticket application performs ticket authentication on the basis of the incremented number of times of use, the attribute information about the ticket of interest, and the ID information extracted from the captured image, and further determines entrance admittance or non-admittance.

More specifically, the ticket application performs ticket authentication of the ticket of interest on the basis of the ID information and the attribute information about the ticket of interest, and also determines whether or not the number of times of use has exceeded an upper limit contained in the attribute information.

In case of success of user authentication in step S167, and success of ticket authentication, and in a state that the number of times of use does not exceed the upper limit, admittance of entrance with the ticket of interest is determined as the entrance admittance/non-admittance determination.

On the other hand, in case of failure of user authentication in step S167 or failure of ticket authentication, or in the state that the number of times of use exceeds the upper limit even at the time of success of both user authentication and ticket authentication, non-admittance of entrance with the ticket of interest is determined as the entrance admittance/non-admittance determination.

In subsequent step S173, the ticket application ends capturing of an image of the superimposition image by the camera 32.

In step S174, the ticket application further requests the electronic ticket storage unit 85 to transmit an entrance admittance/non-admittance image, i.e., an OK image or an NG image, in accordance with a result of the entrance admittance/non-admittance determination, and acquires the transmitted entrance admittance/non-admittance image.

Then, in subsequent step S175, the ticket application requests the display unit 58 to display the entrance admittance/non-admittance image. In step S222, the display unit 58 displays the entrance admittance/non-admittance image in response to the request from the ticket application.

In step S154, the user presents the entrance admittance/non-admittance image displayed on the display unit 58 to the gate staff for checking.

In case of the OK image displayed as the entrance admittance/non-admittance image, the user passes through the entrance gate 11 in step S155.

Then, in subsequent step S156, the user operates the touch panel 31 to end display of the entrance admittance/non-admittance image.

In step S176, the ticket application ends display of the entrance admittance/non-admittance image on the display unit 58 in response to the operation by the user.

Note that the user is stopped by the gate staff in case of the NG image presented as the entrance admittance/non-admittance image.

In addition, while display of the entrance admittance/non-admittance image is ended (entrance admittance/non-admittance image is deleted) in response to the operation by the user in FIG. 23 similarly to the example in FIG. 14, entrance admittance/non-admittance image may be deleted after an elapse of a predetermined time from a state unable to extract encoded information as described with reference to FIG. 13.

In addition, while the authentication standby image is displayed on the display unit 58 in step S221 prior to user authentication in FIG. 23, the authentication standby image may be displayed after success of user authentication as described with reference to FIGS. 21 and 22.

<Entrance Gate System of Present Technology in Second Embodiment>

Figure 24:
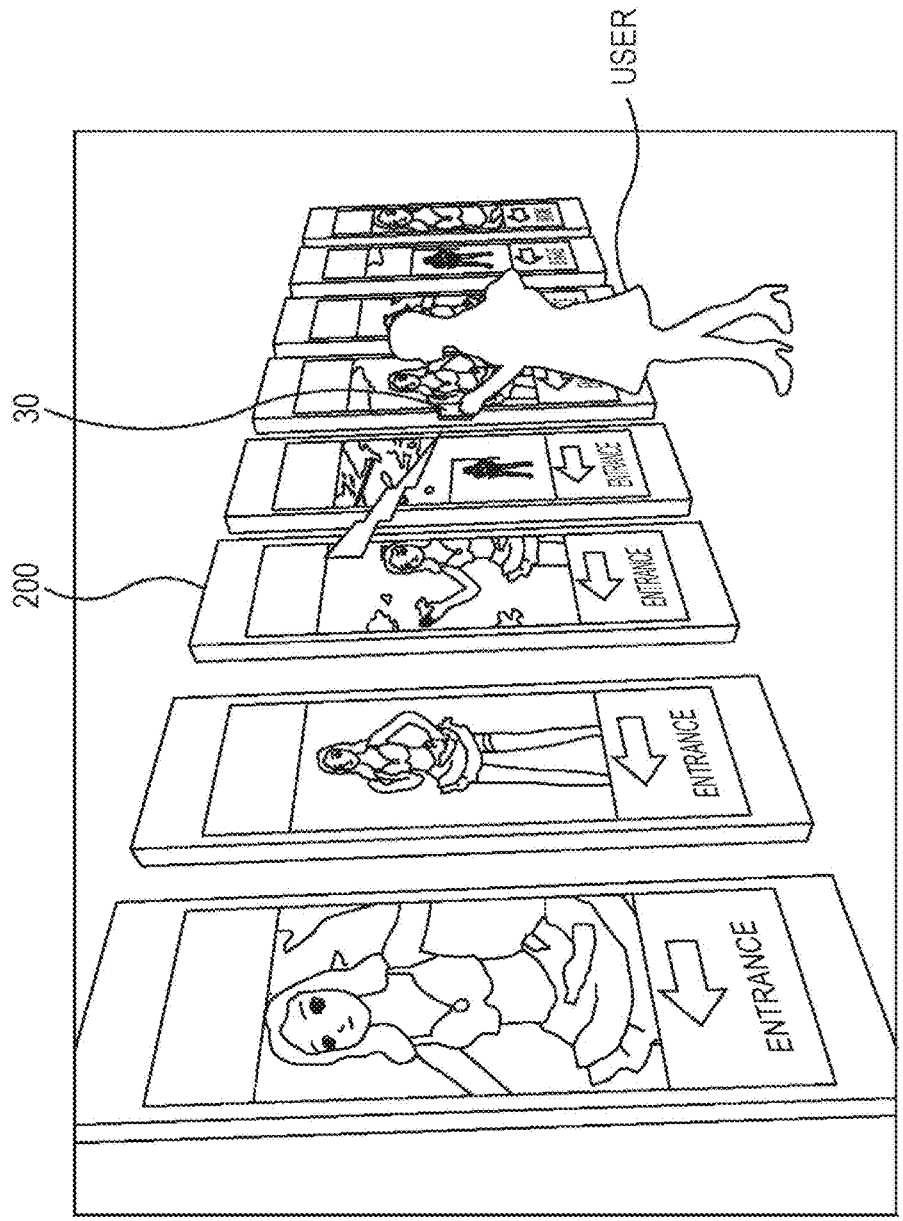
FIG. 24 is a view illustrating a configuration example of an entrance gate system to which the present technology has been applied according to a second embodiment.

FIG. 24 is a view illustrating a configuration example of an entrance gate system to which the present technology has been applied according to a second embodiment.

The entrance gate system in FIG. 24 is constituted by one or more gate display devices 20, and the portable terminal 30 carried by the user.

The gate display device 20 is configured similarly to the gate display device 20 in FIG. 12, while the portable terminal 30 configured similarly to the portable terminal 30 in FIG. 12 or FIG. 21.

As described with reference to FIGS. 19A and 19B, the extraction unit 85 of the portable terminal 30 is allowed to extract ID information from a captured image even in case of use of any image as an original image (background image of original image).

In certain events, however, for example, various types of videos may be shown for uplifting feelings of users. For example, a promotional video of a performer may be shown inside an event site of a concert event, or a preview video may be shown in a movie theater.

The portable terminal 30 is allowed to extract ID information from a captured image of a superimposition image containing such a video and ID information superimposed on the video. Accordingly, the gate display device 20 is allowed to display this type of superimposition image.

FIG. 24 illustrates a plurality of the gate display devices 20 disposed on a floor along a lane of a not-shown entrance gate. Each of the gate display devices 20 displays a superimposition image containing a promotional video and ID information superimposed on the promotion video.

Each of the plurality of gate display devices 20 displays a superimposition image which contains one of various scenes of a promotion video, and ID information superimposed on the promotion video.

The user walks toward the entrance gate along the lane provided with the plurality of gate display devices 20. In this case, the user points the portable terminal 30 to the gate display devices 20 while enjoying the promotion videos displayed as superimposition images on the plurality of gate display devices 20. The portable terminal 30 in this condition is capable of performing ticket authentication (and user authentication) similarly to the example described above.

<Entrance Gate System of Present Technology in Third Embodiment>

Figure 25:
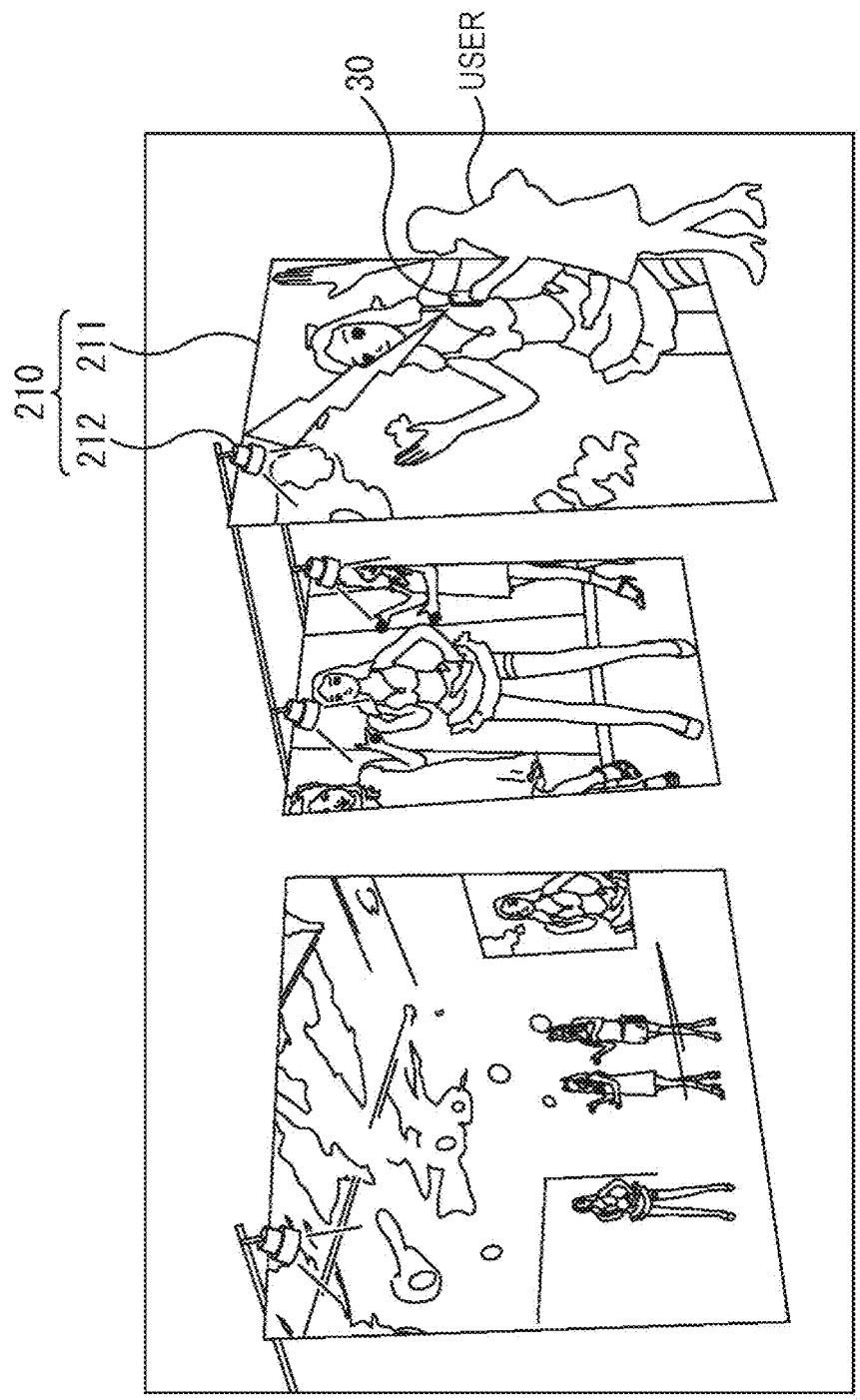
FIG. 25 is a view illustrating a configuration example of an entrance gate system to which the present technology has been applied according to a third embodiment.

FIG. 25 is a view illustrating a configuration example of an entrance gate system to which the present technology has been applied according to a third embodiment.

The entrance gate system in FIG. 25 includes one or more gate display devices 210, and the portable terminal 30 carried by the user.

Each of the gate display devices 210 in FIG. 25 includes a poster 211 as a printed matter, and an illumination device 212.

A predetermined image (picture) for advertising an event is printed on the poster 211 as a printed matter, for example.

The illumination device 212 is constituted by a spotlight provided on an upper portion of the poster 211, for example. The illumination device 212 emits illumination light to illuminate the poster 211.

In the entrance gate system illustrated in FIG. 25, the posters 211 are provided along the lane of the entrance gate in the event site for the purpose of uplifting a feeling of the user.

The illumination device 212 varies radiance of illumination on the basis of ID information substantially at a speed not perceptible by a sense of vision of a human. Accordingly, reflection light reflected on each of the posters 211 forms a superimposition image which contains the printed image on the poster 211, and ID information indicating time radiance variations and superimposed on the printed image.

The user points the portable terminal 30 toward the poster 211 to capture an image of the superimposition image formed by reflection light reflected on the poster 211. The portable terminal 30 in this condition is capable of performing ticket authentication (and user authentication) similarly to the example described above.

<Functional Configuration Example of Gate Display Device 210 and Portable Terminal 30>

Figure 26:
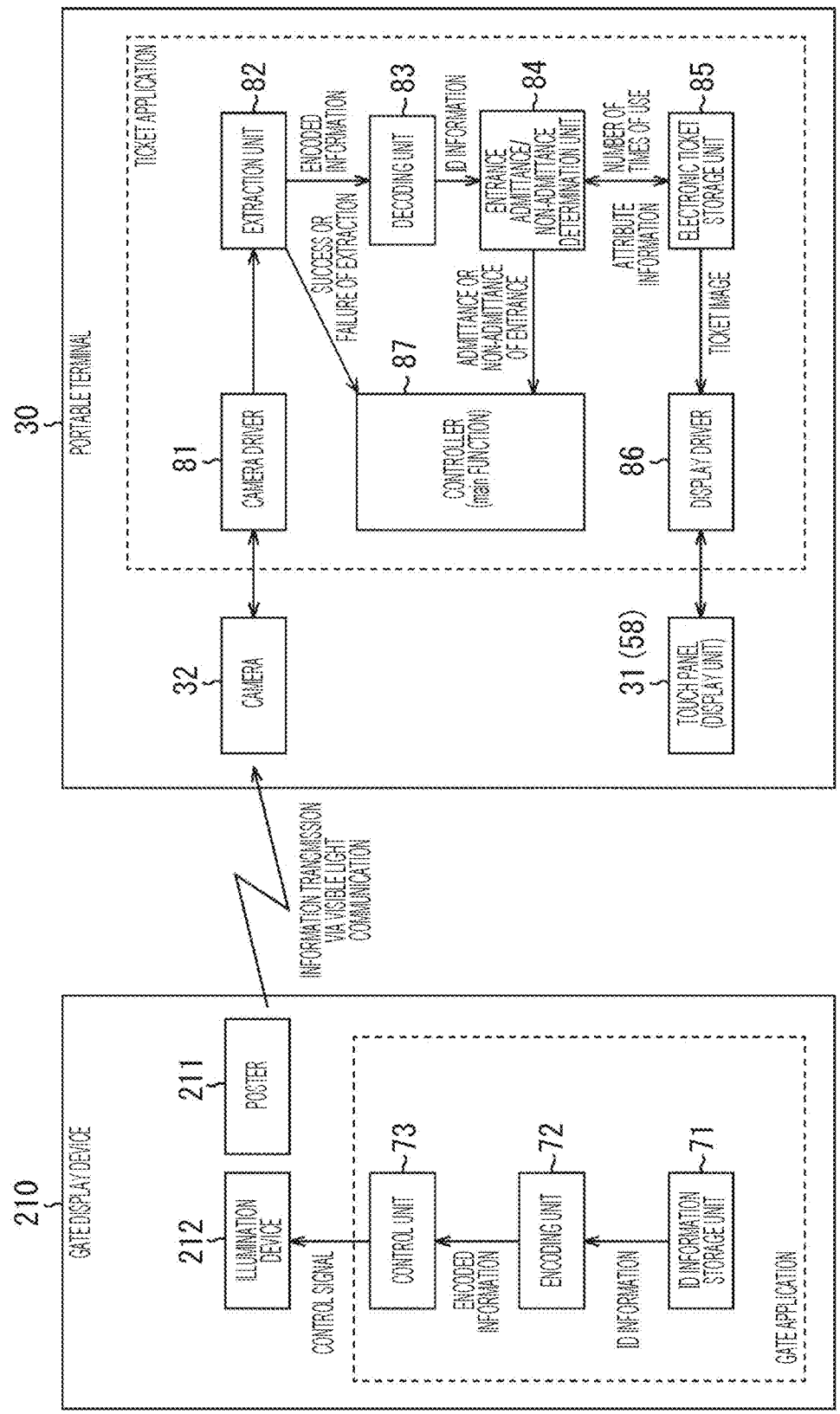
FIG. 26 is a block diagram showing a functional configuration example of a gate display device 210 and the portable terminal 30.

FIG. 26 is a block diagram showing an example of functional configurations of one of the gate display devices 210 and the portable terminal 30 in FIG. 25.

Note that parts identical to the corresponding parts in FIG. 12 are given identical reference numbers, and description of these parts are omitted where appropriate.

The portable terminal 30 in FIG. 26 is configured similarly to the portable terminal 30 in FIG. 12.

On the other hand, the gate display device 210 in FIG. 26 is different from the gate display device 20 in FIG. 12 in that the poster 211 and the illumination device 212 are provided in place of the display unit 21.

The control unit 73 in FIG. 26 supplies a control signal to the illumination device 212 to control radiance of light emitted from the illumination device 212 on the basis of encoded information received from the encoding unit 72, thereby superimposing ID information (encoded ID information) on the image (original image) printed on the poster 211.

More specifically, the control unit 73 varies (modulates) radiance of the illumination device 212 at a speed not perceptible by a sense of vision of a human on the basis of encoded information to superimpose ID information indicating time radiance variations on the image printed on the poster 211. As a result, reflection light reflected on the poster 211 forms a superimposition image on which ID information indicating time radiance variations is superimposed on the image printed on the poster 211.

The portable terminal 30 captures an image of the image (superimposition image) formed by reflection light reflected on the poster 211. Thereafter, the portable terminal 30 extracts ID information from the captured image of the superimposition image, and performs ticket authentication on the basis of the extracted ID information.

Note that ID information indicating time radiance variations may be superimposed on a predetermined image formed by a projector, for example, rather than on the image printed on the poster 211 as in the example described above. In this case, the portable terminal 30 may capture an image of a projection image projected by the projector on a screen, and extract ID information from the captured image.

In addition, the portable terminal 30 in FIG. 26 may be configured similarly to the portable terminal 30 in FIG. 21.

<Entrance Gate System of Present Technology in Fourth Embodiment>

Figure 27:
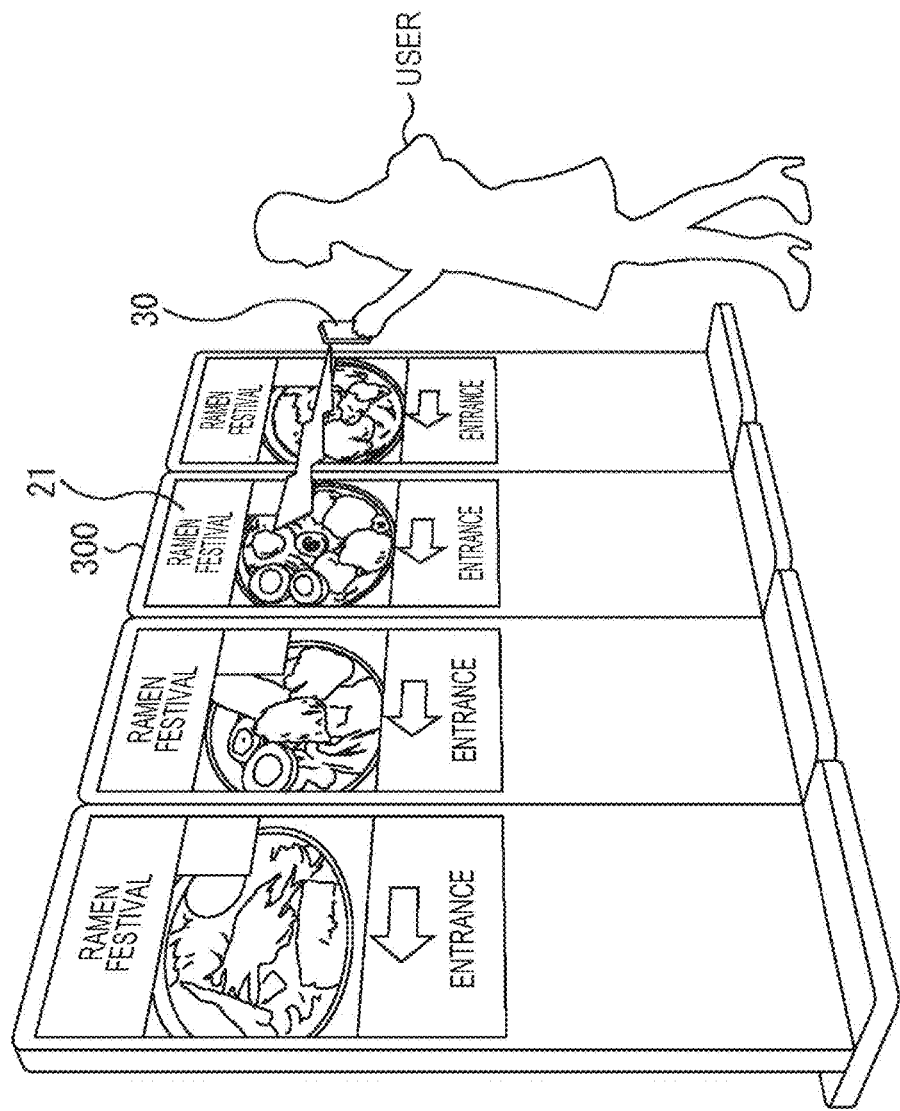
FIG. 27 is a view illustrating a configuration example of an entrance gate system to which the present technology has been applied according to a fourth embodiment.

FIG. 27 is a view illustrating a configuration example of an entrance gate system to which the present technology has been applied according to a fourth embodiment.

The entrance gate system in FIG. 27 is constituted by one or more gate display devices 300, and the portable terminal 30 carried by the user.

Each of the gate display devices 300 in FIG. 27 includes the display unit 21 similarly to the gate display device 20, and displays a superimposition image on which ID information and a coupon ticket (electronic coupon information) are superimposed.

For example, as a privilege for users in an event, a coupon ticket for one free drink service or the like may be given to the user at the time of entrance.

According to the entrance gate system in FIG. 27, the gate display device 300 displays a superimposition image which contains an original image, and a coupon ticket indicating time radiance variations and superimposed on the original image, in addition to ID Information, to provide a coupon ticket to the user.

More specifically, the user captures an image of the superimposition image by using the portable terminal 30. The entrance gate system in FIG. 27 realizes ticket authentication, and also offers a coupon ticket to the user on the basis of the captured image.

In FIG. 27, a plurality of the gate display devices 300 are provided on a floor along a lane of a not-shown entrance gate.

Each of the plurality of gate display devices 300 displays a superimposition image which contains an original image displaying a text for guidance to the entrance gate, and products purchasable in an event site, and further contains ID information and a coupon ticket superimposed on the original image.

The product displayed on the superimposition image is different for each of the gate display devices 300, for example. A coupon ticket superimposed on the superimposition image is a discount coupon ticket for the product displayed on the superimposition image.

The user walks toward the entrance gate along the lane provided with the plurality of gate display devices 300, and points the portable terminal 30 to the gate display device 300 on which a superimposition image containing a desired product is displayed. As a result, the portable terminal 30 performs ticket authentication (and user authentication) similarly to the examples described above. The portable terminal 30 further obtains a coupon ticket of the product desired by the user.

<Functional Configuration Example of Gate Display Device 300 and Portable Terminal 30>

Figure 28:
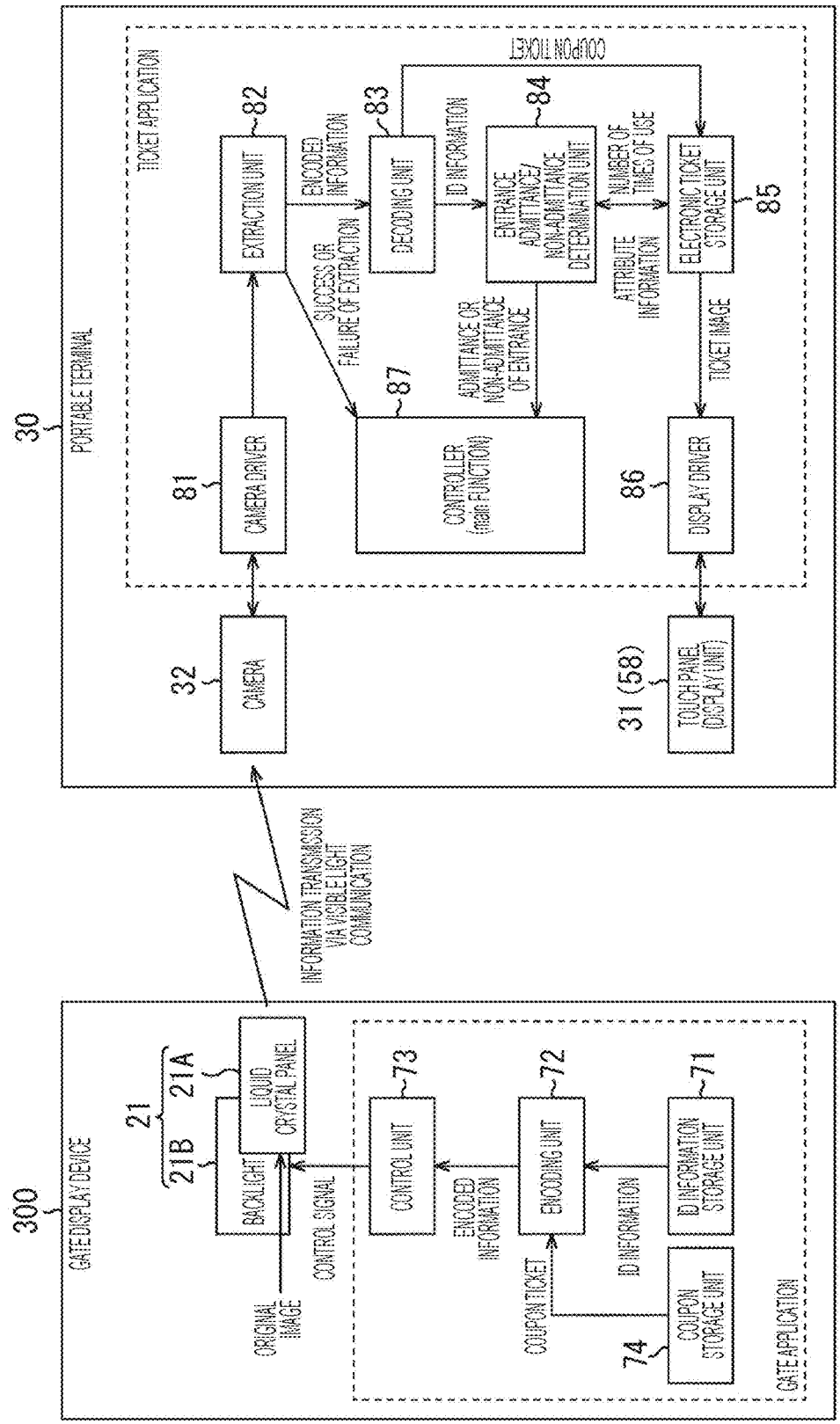
FIG. 28 is a block diagram showing a functional configuration example of a gate display device 300 and the portable terminal 30.

FIG. 28 is a block diagram showing an example of functional configurations of the gate display device 300 and the portable terminal 30 in FIG. 27.

Note that parts identical to the corresponding parts in FIG. 12 are given identical reference numbers, and description of these parts are omitted where appropriate.

The gate display device 300 in FIG. 28 is different from the gate display device 20 in FIG. 12 in that a coupon storage unit 74 is added.

The coupon storage unit 74 stores a coupon ticket of a product displayed on an original image.

The encoding unit 72 in FIG. 28 encodes the ID information, and subsequently encodes the coupon ticket stored in the coupon storage unit 74 in a manner similar to encoding of the ID information, for example, and supplies respective items of the encoded information to the control unit 73.

The original image shown in FIG. 28 is an image containing a text for guidance to the entrance gate, and a product purchasable in the event site as described with reference to FIG. 27.

Accordingly, the control unit 73 in FIG. 28 controls radiance of light emitted from the backlight 21B on the basis of the encoded information received from the encoding unit 72 to display, on the display unit 21, a superimposition image containing the original image showing the text for guidance to the entrance gate and the product purchasable in the event site, and the coupon ticket of the product and the ID information superimposed on the original image.

When the portable terminal 30 captures an image of the superimposition image displayed on the display unit 21, the ID information is extracted from the captured image of the superimposition image to perform ticket authentication on the basis of the ID information.

In addition, the portable terminal 30 in FIG. 28 extracts the coupon ticket from the captured image similarly to the ID information.

More specifically, the extraction unit 82 of the portable terminal 30 extracts the encoded coupon information from the captured image, and the decoding unit 83 decodes the encoded information into a coupon ticket.

The coupon ticket decoded by the decoding unit 83 is supplied to the electronic ticket storage unit 85, and registered in association with the ticket of interest.

The coupon ticket registered in the electronic ticket storage unit 85 in association with the ticket of interest is displayed on the touch panel 31 in accordance with an operation of the portable terminal 30 by the user. The user is capable of receiving a service for the desired product by presenting the coupon ticket displayed on the touch panel 31 in the event site.

Note that the portable terminal 30 in FIG. 28 may be configured to perform user authentication on the basis of biometric authentication similarly to the example in FIG. 21.

The respective entrance gate systems to which the present technology has been applied are capable of meeting the foregoing first through fifth demands concerning entrance into an event or the like.

More specifically, the first demand concerning entrance into an event or the like requires simultaneous entrance of a large number of attendants (passage through entrance gates). The respective entrance gate systems according to the present technology meet the first demand.

For example, according to the respective gate systems of the present technology, the gate display device 20 of the entrance gate 11 (or gate display devices 210 and 300) displays a superimposition image on which ID information is superimposed, and performs ticket authentication on the basis of a captured image of the superimposition image captured by the portable terminal 30.

In this case, each of the portable terminals 30 performs ticket authentication according to the entrance gate systems to which the present technology has been applied. Accordingly, processes for ticket authentication are executable for a large number of users as completely parallel processes.

In addition, according to the entrance gate systems to which the present technology has been applied, authentication is allowed to start from a position a little away from the gate display device 20 by sufficient enlargement of the size of the superimposition image to be displayed on the gate display device 20.

Moreover, according to the entrance gate systems to which the present technology has been applied, no communication with an authentication server is required for ticket authentication. Accordingly, a speed of ticket authentication is not limited by a communication band in the event site.

As a result, the user is allowed to pass through the entrance gate 11 without the necessity of slowing down a pace of walking toward the entrance gate 11.

Furthermore, according to the entrance gate systems to which the present technology has been applied, the gate display device 20 superimposes ID information indicating time radiance variations on an original image, and displays a superimposition image thus obtained. Thereafter, the portable terminal 30 captures an image of the superimposition image, and extracts the ID information from the captured image of the superimposition image.

An extraction technology adopted herein by the portable terminal 30 for extracting ID information from a superimposition image is a technology which captures an image of a superimposition image by using the camera 32 including a focal-plane shutter system image sensor, and converts ID information superimposed on the superimposition image and indicating time radiance variations into information indicating spatial radiance variations of the captured image.

The focal-plane shutter system image sensor is constituted by a CMOS image sensor, for example, which is widely adopted in portable terminals such as smartphones. Accordingly, the user is not required to prepare a special device for extraction of ID information from a captured image.

Furthermore, according to the entrance gate systems to which the present technology has been applied, a result of entrance admittance/non-admittance based on ticket authentication or the like is displayed on the portable terminal 30 as a result image. Accordingly, the gate staff is capable of easily checking an electronic ticket only by viewing the result image.

In addition, the result image may be contained in an electronic ticket and presented to the user. In this case, an event organizer may prepare a result image constituted by an image easy to check, and difficult to copy on the spot, for example.

Furthermore, according to the entrance gate systems to which the present technology has been applied, an image of a superimposition image displayed on the gate display device 20 is captured by the camera 32 provided on the front face identical to the face of the touch panel 31 of the portable terminal 30. In this case, the user is allowed to have a posture for presenting a result image to the gate staff, while capturing an image of the superimposition image by using the portable terminal 30, as a result image for showing a result of entrance admittance/non-admittance determination based on ticket authentication or the like performed in accordance with ID information extracted from the captured image of the superimposition image. Accordingly, a passing speed of the user through the entrance gate 11 increases.

Furthermore, according to the entrance gate systems to which the present technology has been applied, a result image is deleted after an elapse of a predetermined time from a state unable to extract ID information by the portable terminal 30. In this case, the result image is deleted without an elapse of a long period from passage of the user through the entrance gate 11. Accordingly, a third party is difficult to illegally copy the result image on the spot.

In addition, the second demand concerning entrance into an event or the like is to eliminate confusion caused by a state that lanes of different classes are disposed adjacent to each other. The respective entrance gate systems to which the present technology has been applied are capable of meeting the second demand.

For example, according to the entrance gate systems to which the present technology has been applied, ID information is transmitted from the gate display device 20 to the portable terminal 30 as visible light on a superimposition image. In view of directivity of visible light, crosstalk of ID information is not caused between adjoining lanes unless the camera 32 of the portable terminal 30 is not pointed to the gate display device 20 of the adjoining lane.

Accordingly, ticket authentication errors caused by crosstalk of ID information between adjoining lanes, and therefore confusion between lanes of different classes disposed adjacent to each other are avoidable.

In addition, the third demand concerning entrance into an event or the like is to prohibit or limit re-entrance. The respective entrance gate systems to which the present technology has been applied are capable of meeting the third demand.

For example authentication based on a QR code or the like read by a reader is performed on the side reading the QR code or the like.

On the other hand, according to the entrance gate systems to which the present technology has been applied, ticket authentication is performed not by the gate display device 20, but by the portable terminal 30. In this case, the portable terminal 30 is allowed to store the number of times of use of an electronic ticket.

Accordingly, prohibition of re-entrance with an electronic ticket, or limitation of entrance (re-entrance) with the electronic ticket to N times more than once is realizable on the basis of the number of times of use of the electronic ticket stored in the portable terminal 30.

Note that no communication is produced between the gate display device 20 and the portable terminal 30 even in case of prohibition of re-entrance or limitation of the number of times of entrance to N times based on the number of times of use of the electronic ticket stored in the portable terminal 30. Accordingly, a passage speed of the user passing through the entrance gate 11 is not lowered by prohibition of re-entrance or limitation of the number of times of entrance to N times based on the number of times of use.

The fourth demand concerning entrance into an event or the like is to prohibit shared use of a ticket. The respective entrance gate systems to which the present technology has been applied are capable of meeting the fourth demand.

For example, according to the entrance gate systems to which the present technology has been applied, entrance admittance/non-admittance is determined on the basis of results of biometric authentication and user authentication performed by the entrance gate systems. In case of user authentication based on biometric authentication, for example, it may be checked whether or not a user using an electronic ticket at second entrance or onwards is different from a user using the electronic ticket at initial entrance.

In addition, according to the entrance gate systems to which the present technology has been applied, biotic information about the user for biometric authentication is not output to the outside of the portable terminal 30, but contributes to protection of personal information. Accordingly, the user is allowed to use biometric authentication at ease.

An association method for associating biotic information about the user with an electronic ticket includes a first association method which associates acquired biotic information with an electronic ticket as registered biotic information at the time of initial use of the electronic ticket as described with reference to FIG. 20. In addition, the association method includes a second association method which associates acquired biotic information with an electronic ticket as registered biotic information at any timing prior to use of the electronic ticket, such as a time immediately after purchase of the electronic ticket as described with reference to FIG. 20.

In case of a user who uses an electronic ticket but is different from an owner of the portable terminal 30, the first association method may be adopted as the association method for associating biotic information about the user with the electronic ticket.

More specifically, in case of a user who rents the portable terminal 30 in an event site, purchases an electronic ticket as necessary, and uses the electronic ticket for entrance into the event site, purchase of products or for other purposes, for example, biotic information about the user as the user of the electronic ticket may be associated with the electronic ticket by the first association method.

On the other hand, for example, in case of an event which allows only a purchaser of an electronic ticket to use the electronic ticket, the second association method may be adopted as the association method for associating biotic information about the purchaser with the electronic ticket. In this case, the biotic information about the purchaser may be associated with the electronic ticket at the time of (immediately after) purchase of the electronic ticket, for example.

Biotic information may be an image of a whole face, an image of an eye part, or a fingerprint, for example, as described with reference to FIG. 20.

In case of adoption of an image of a whole face or an image of an eye part as biotic information, the camera 33 provided on the side opposite to the camera 32 on the front face of the portable terminal 30 may be used for capturing an image of the whole face or an image of the eye part.

Simultaneous capturing of images of a superimposition image and the face is achievable by the use of the camera 33 for capturing an image of the whole face or an image of the eye part, i.e., by pointing the camera 32 on the front face of the portable terminal 30 toward the gate display device 20, and pointing the camera 33 on the rear face of the portable terminal 30 toward the user. In this case, user also simultaneously achieves an action for presenting, to the gate staff, a result image displayed on the touch panel 31 on the front face of the portable terminal 30 to show an authentication result of ticket authentication based on ID information superimposed on a captured image of the superimposition image, and on user authentication by biometric authentication based on the face image.

The fifth demand concerning entrance into an event or the like is to provide a temporary entrance gate at low cost. The respective entrance gate systems to which the present technology has been applied are capable of meeting the fifth demand.

According to the entrance gate systems to which the present technology has been applied, only the gate display device 20 disposed on the entrance gate 11 or in the vicinity of the entrance gate 11 is needed to perform ticket authentication (and user authentication) without the necessity of preparing an authentication server for authentication.

According to the present specification herein, processes performed by a computer (CPU 41, 51) under programs are not required to be executed in time series in the order described in the flowcharts. Accordingly, the processes executed by the computer under the programs include processes executed in parallel or individually (such as parallel processes or processes by objects).

In addition, the programs may be processed only by one computer (processor), or may be separately processed by a plurality of computers. In addition, the programs may be transferred to and executed by a remote computer.

Furthermore, according to the present specification, the system refers to a collection of plural constituent elements (such as devices and modules (parts)). In this case, all of the constituent elements are not required to be included in an identical housing. Accordingly, multiple devices accommodated in separate housings and connected via a network, and one device including multiple modules accommodated within one housing are both regarded as systems.

Note that embodiments of the present technology are not limited to the specific embodiment described herein. Various modifications and changes may be made without departing from the subject matters of the present technology.

For example, the present technology may adopt a cloud computing structure where a plurality of devices share one function and perform the function in cooperation with each other via a network.

Moreover, the respective steps described with reference to the foregoing flowcharts may be shared and executed by multiple devices rather than executed by one device.

Furthermore, when multiple processes are contained in one step, the multiple processes contained in the one step may be shared and executed by multiple devices rather than executed by one device.

Besides, advantageous effects described in the present specification are presented only by way of example. Other advantageous effects may be offered.

Note that the present technology may have the following configurations.

<1>

An information processing device including:

an extraction unit that extracts ID information from a captured image of a superimposition image, the superimposition image containing a predetermined image and the ID information superimposed on the predetermined image, to determine admittance or non-admittance of entrance with an electronic ticket on the basis of the ID information; and an entrance admittance/non-admittance determination unit that determines admittance or non-admittance of entrance with the electronic ticket on the basis of the electronic ticket stored in a storage unit, and on the ID information.

<2>

The information processing device according to <1>, in which a providing device that provides the superimposition image superimposes the ID information that indicates time radiance variations on the predetermined image, the captured image is an image of the superimposition image and captured by a focal-plane shutter system camera, and the extraction unit extracts the ID information on the basis of spatial radiance variations on the captured image.

<3>

The information processing device according to <2>, in which the providing device includes a backlight, and a display unit that displays an image, and the ID information is superimposed on the predetermined image by controlling radiance of the backlight on the basis of the ID information.

<4>

The information processing device according to <2>, in which the providing device includes an illumination device that illuminates a printed matter on which the predetermined image has been printed, and superimposes the ID information on the predetermined image by controlling radiance of illumination from the illumination device on the basis of the ID information.

<5>

The information processing device according to any one of <2> through <4>, in which the extraction unit integrates pixel values of only background pixels in pixels of the captured image for each line to obtain line integrated values, the extraction unit obtains deviations of the line integrated values from an average of the line integrated values of all the lines of the captured image, and the extraction unit separates the ID information superimposed on the captured image by performing deconvolution of the deviations of the line integrated values by using a shutter function indicating characteristics of a shutter of the camera.

<6>

The information processing device according to any one of <2> through <4>, in which the camera captures an image of the superimposition image in a first exposure period and a second exposure period that are different for each line, the first exposure period is a period that is equivalent to an integral multiple of a cycle of variations of radiance of the captured image, in pixels of the captured image obtained by acquiring an image of the superimposition image in exposure periods different for each line, the extraction unit integrates pixel values of the pixels captured in the first exposure period for each line to obtain a first integrated value, and further integrates pixel values of the pixels captured in the second exposure period for each line to obtain a second integrated value, and the extraction unit separates the ID information superimposed on the captured image by utilizing a relationship that the second integrated value is proportional to a product of the first integrated value and convolution of the ID information and a shutter function indicating the second exposure period.

<7>

The information processing device according to any one of <1> through <6>, further including a result display unit that displays a result image indicating a determination result of admittance or non-admittance of entrance with the electronic ticket.

<8>

The information processing device according to <7>, in which the result image is associated with the electronic ticket.

<9>

The information processing device according to <7> or <8>, further including a camera that captures an image of the superimposition image to acquire the captured image, in which the camera and the result display unit are disposed on an identical face.

<10>

The information processing device according to any one of <7> through <9>, in which, in a case where the extraction unit comes into a state unable to extract the ID information after the result display unit displays the result image, the result image displayed on the result display unit is deleted after an elapse of a predetermined time from the state unable to extract the ID information.

<11>

The information processing device according to any one of <1> through <10>, in which, the storage unit stores a number of times of use of the electronic ticket, and the entrance admittance/non-admittance determination unit determines non-admittance of entrance with the electronic ticket in a case where the number of times of use exceeds an upper limit.

<12>

The information processing device according to any one of <1> through <11>, further including:

a biosensor that acquires biotic information about a user; and an authentication unit that performs authentication by using the biotic information, in which admittance or non-admittance of entrance with the electronic ticket is determined also on the basis of a result of authentication by using the biotic information.

<13>

The information processing device according to <12>, in which acquired biotic information that is biotic information acquired by the biosensor is stored as registered biotic information in association with the electronic ticket at initial use of the electronic ticket, and the authentication unit compares the acquired biotic information with the registered biotic information to perform authentication.

<14>

The information processing device according to <12>, in which acquired biotic information that is biotic information acquired by the biosensor is stored as registered biotic information in association with the electronic ticket prior to use of the electronic ticket, and the authentication unit compares the acquired biotic information with the registered biotic information to perform authentication.

<15>

The information processing device according to any one of <12> through <14>, in which the biosensor is a camera that captures an image, and the authentication unit performs face image authentication or iris authentication by using a face image that is the biotic information captured by the camera corresponding to the biosensor.

<16>

The information processing device according to any one of <12> through <14>, in which the biosensor is a fingerprint sensor that captures a fingerprint, and the authentication unit performs fingerprint authentication by using a fingerprint obtained by the fingerprint sensor.

<17>

The information processing device according to any one of <12> through <15>, further including:

a first camera that captures an image of the superimposition image to acquire the captured image; and a second camera provided on a rear face of the first camera, in which the biosensor constitutes the second camera.

<18>

An information processing method including steps of:

extracting ID information from a captured image of a superimposition image, the superimposition image containing a predetermined image and the ID information superimposed on the predetermined image, to determine admittance or non-admittance of entrance with an electronic ticket on the basis of the ID information; and determining admittance or non-admittance of entrance with the electronic ticket on the basis of the electronic ticket stored in a storage unit, and on the ID information.

<19>

A program under which a computer performs functions of:

an extraction unit that extracts ID information from a captured image of a superimposition image, the superimposition image containing a predetermined image and the ID information superimposed on the predetermined image, to determine admittance or non-admittance of entrance with an electronic ticket on the basis of the ID information; and an entrance admittance/non-admittance determination unit that determines admittance or non-admittance of entrance with the electronic ticket on the basis of the electronic ticket stored in a storage unit, and on the ID information.

<20>

An information processing system including:

a providing device that provides a superimposition image that contains a predetermined image, and ID information superimposed on the predetermined image and used for determining admittance or non-admittance of entrance with an electronic ticket; and an information processing device that includes
an extraction unit that extracts the ID information from a captured image of the superimposition image provided by the providing device, and
an entrance admittance/non-admittance determination unit that determines admittance or non-admittance of entrance with the electronic ticket on the basis of the electronic ticket stored in a storage unit, and on the ID information.

REFERENCE SIGNS LIST

11 Entrance gate
11 Support
11B Beam
20 Gate display device
21 Display unit
21A Liquid crystal panel
21B Backlight
30 Portable terminal
31 Touch panel
32, 33 Camera
41 CPU
41 Memory
43 Hard disk
44 Communication unit
45 External I/F
45A Removable medium
46 Operation unit
47 Speaker
51 CPU
52 Memory
53 Storage
54 Communication unit
55 External I/F
55A Removable medium
56 Microphone
57 Speaker
58 Display unit
59 Position detection mechanism
71 ID information storage unit
72 Encoding unit
73 Control unit
74 Coupon storage unit
81 Camera driver
82 Extraction unit
83 Decoding unit
84 Entrance admittance/non-admittance determination unit
85 Electronic ticket storage unit
86 Display driver
101 Background determination unit
102 Integration unit
103 Integrated value storage unit
104 Deviation calculation unit
105 Separation unit
106 Error correction unit
107 Information storage unit
121 Biosensor
122 Biosensor driver
123 Biometric authentication unit
210 Gate display device
211 Poster
212 Illumination device
300 Gate display device

The invention claimed is:

1. An information processing device, comprising:
circuitry configured to:
extract identification (ID) information from a captured image of a superimposition image,
wherein the superimposition image comprises a first image and the ID information superimposed on the first image for determination of one of admittance or non-admittance of entrance with an electronic ticket based on the ID information; and
determine one of the admittance or the non-admittance of the entrance with the electronic ticket based on the electronic ticket stored in a memory and the ID information,
wherein the superimposition image is provided by a gate display screen at an entrance,
wherein the superimposition image is superimposed on the ID information that indicates time radiance variations on the first image,
wherein the captured image is a second image of the superimposition image and captured by a focal-plane shutter system camera, and
wherein the ID information is extracted based on spatial radiance variations on the captured image.

2. The information processing device according to claim 1,
wherein the gate display screen includes a backlight, and a display screen that displays the first image, and
wherein the ID information is superimposed on the first image by control of radiance of the backlight based on the ID information.

3. The information processing device according to claim 1, wherein the gate display screen includes an illuminator that illuminates a printed matter on which the first image is printed, and superimposes the ID information on the first image by control of radiance of illumination from the illuminator based on the ID information.

4. The information processing device according to claim 1, wherein the circuitry is further configured to:
integrate pixel values of only background pixels in pixels of the captured image for each line to obtain line integrated values,
obtain deviations of the line integrated values from an average of the line integrated values of all lines of the captured image, and
separate the ID information superimposed on the captured image by deconvolution of the deviations of the line integrated values by use of a shutter function indicating characteristics of a shutter of the focal-plane shutter system camera.

5. The information processing device according to claim 1,
wherein the focal-plane shutter system camera captures the second image of the superimposition image in a first exposure period and a second exposure period that are different for each line,
wherein the first exposure period is a period that is equivalent to an integral multiple of a cycle of variations of radiance of the captured image,
wherein, in pixels of the captured image obtained by acquisition of the second image of the superimposition image in exposure periods different for each line, the circuitry is further configured to:
integrate pixel values of the pixels captured in the first exposure period for each line to obtain a first integrated value,
integrate pixel values of the pixels captured in the second exposure period for each line to obtain a second integrated value, and
separate the ID information superimposed on the captured image based on a relationship that the second integrated value is proportional to a product of the first integrated value and a convolution of the ID information and a shutter function indicating the second exposure period.

6. The information processing device according to claim 1, further comprising a result display screen configured to display a result image indicating a determination result of one of the admittance or the non-admittance of the entrance with the electronic ticket.

7. The information processing device according to claim 6, wherein the result image is associated with the electronic ticket.

8. The information processing device according to claim 6, wherein the focal-plane shutter system camera and the result display screen are on an identical face.

9. The information processing device according to claim 6, wherein, when the circuitry is in a state unable to extract the ID information subsequent to the result display screen displays the result image, the result image displayed on the result display screen is deleted subsequent to an elapse of a time from the state unable to extract the ID information.

10. The information processing device according to claim 1,
wherein a number of times of use of the electronic ticket is stored in the memory, and
wherein the circuitry is further configured to determine the non-admittance of the entrance with the electronic ticket when the number of times of use of the electronic ticket exceeds an upper limit.

11. The information processing device according to claim 1, further comprising:
a biosensor configured to acquire user biotic information,
wherein one of the admittance or the non-admittance of the entrance with the electronic ticket is determined based on authentication by use of the user biotic information.

12. The information processing device according to claim 11,
wherein the acquired user biotic information is stored as registered biotic information in association with the electronic ticket at an initial use of the electronic ticket, and
wherein the circuitry is further configured to compare the acquired user biotic information with the registered biotic information for the authentication.

13. The information processing device according to claim 11,
wherein the acquired user biotic information is stored as registered biotic information in association with the electronic ticket prior to use of the electronic ticket, and
wherein the circuitry is further configured to compare the acquired user biotic information with the registered biotic information for the authentication.

14. The information processing device according to claim 11,
wherein the biosensor is a camera, and
wherein the circuitry is further configured to execute one of a face image authentication or an iris authentication by use of a face image that is the user biotic information captured by the camera corresponding to the biosensor.

15. The information processing device according to claim 11,
wherein the biosensor is a fingerprint sensor, and
wherein the circuitry is further configured to execute a fingerprint authentication by use of a fingerprint obtained by the fingerprint sensor.

16. The information processing device according to claim 11, further comprising:
a camera on a rear face of the focal-plane shutter system camera,
wherein the biosensor constitutes the camera.

17. An information processing method, comprising:
extracting identification (ID) information from a captured image of a superimposition image,
wherein the superimposition image comprises a first image and the ID information superimposed on the first image for determination of one of admittance or non-admittance of entrance with an electronic ticket based on the ID information; and
determining one of the admittance or the non-admittance of the entrance with the electronic ticket based on the electronic ticket stored in a memory and the ID information,
wherein the superimposition image is provided by a gate display screen at an entrance,
wherein the superimposition image is superimposed on the ID information that indicates time radiance variations on the first image,
wherein the captured image is a second image of the superimposition image and captured by a focal-plane shutter system camera, and
wherein the ID information is extracted based on spatial radiance variations on the captured image.

18. A non-transitory computer-readable medium having stored thereon computer-executable instructions that, when executed by a computer, cause the computer to execute operations, the operations comprising:
extracting identification (ID) information from a captured image of a superimposition image,
wherein the superimposition image comprises a first a image and the ID information superimposed on the first image for determination of one of admittance or non-admittance of entrance with an electronic ticket based on the ID information; and
determining one of the admittance or the non-admittance of the entrance with the electronic ticket based on the electronic ticket stored in a memory and the ID information,
wherein the superimposition image is provided by a gate display screen at an entrance,
wherein the superimposition image is superimposed on the ID information that indicates time radiance variations on the first image,
wherein the captured image is a second image of the superimposition image and captured by a focal-plane shutter system camera, and
wherein the ID information is extracted based on spatial radiance variations on the captured image.

19. An information processing system, comprising:
a gate display screen configured to display a superimposition image, wherein the superimposition image contains a first image, and identification (ID) information superimposed on the first image and used for determination of one of admittance or non-admittance of entrance with an electronic ticket; and
circuitry configured to:
extract the ID information from a captured image of the superimposition image, and
determine one of admittance or non-admittance of entrance with the electronic ticket based on the electronic ticket stored in a memory and the ID information,
wherein the superimposition image is superimposed on the ID information that indicates time radiance variations on the first image,
wherein the captured image is a second image of the superimposition image and captured by a focal-plane shutter system camera, and wherein the ID information is extracted based on spatial radiance variations on the captured image.

\* \* \* \* \*